United States Patent
Kinzler

(10) Patent No.: US 12,297,060 B2
(45) Date of Patent: *May 13, 2025

(54) MOBILE MOTORIZED CARGO CONTAINER WITH SELECTIVELY DEPLOYABLE CONTROL SYSTEMS

(71) Applicant: Jeffrey Lawrence Kinzler, Melville, NY (US)

(72) Inventor: Jeffrey Lawrence Kinzler, Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,401

(22) Filed: Dec. 22, 2023

(65) Prior Publication Data

US 2024/0228198 A1 Jul. 11, 2024

Related U.S. Application Data

(63) Continuation of application No. 17/981,803, filed on Nov. 7, 2022, now Pat. No. 11,873,176, which is a
(Continued)

(51) Int. Cl.
*B62B 5/04* (2006.01)
*B61B 1/02* (2006.01)
(Continued)

(52) U.S. Cl.
CPC .............. *B65G 67/20* (2013.01); *B61B 1/02* (2013.01); *B61D 3/20* (2013.01); *B62B 5/0033* (2013.01); *B62B 5/04* (2013.01); *B62B 5/0414* (2013.01); *B62B 5/06* (2013.01); *G05D 1/0088* (2013.01); *G05D 1/0212* (2013.01); *G05D 1/228* (2024.01); *G05D 1/646* (2024.01); *B61B 13/00* (2013.01)

(58) Field of Classification Search
CPC .................................................... B62B 5/0414
See application file for complete search history.

(56) References Cited

U.S. PATENT DOCUMENTS 4,543,027 A * 9/1985 Jones ...................... B65G 67/20
414/400
5,421,688 A * 6/1995 Fuchtey ............... B65G 63/004
414/561
(Continued)

*Primary Examiner* — Mark C Hageman
(74) *Attorney, Agent, or Firm* — John F. Vodogia

(57) ABSTRACT

An Urban Intermodal Freight System is capable of transporting large volumes and tonnage of freight by containerized or other means on a mass transit rail system. It captures excess capacity in the existing mass transit rail infrastructure to move packages, parcels, and freight by using miniaturized intermodal cargo containers that are designed to integrate seamlessly with the existing transit infrastructure, while displacing delivery trucks from increasingly crowded city streets. By enabling inbound trucks to transfer their cargo to the Urban Intermodal Freight System at a city's outskirts, freight is delivered without trucks entering congested downtown areas, greatly alleviating traffic congestion, delays, greenhouse gas emissions and other negative environmental impacts. The Linear Loading Dock and Conveyor System may have other useful applications, for example to access a facility, building or vehicle, or in other circumstances where off street truck parking or loading docks are not available.

3 Claims, 20 Drawing Sheets

Related U.S. Application Data continuation of application No. 17/460,199, filed on Aug. 28, 2021, now Pat. No. 11,535,465, which is a continuation-in-part of application No. 17/030,323, filed on Sep. 23, 2020, now Pat. No. 11,104,364.

(60) Provisional application No. 62/905,961, filed on Sep. 25, 2019.

(51) Int. Cl.
| | | |
|---|---|---|
| *B61D 3/20* | (2006.01) | |
| *B62B 5/00* | (2006.01) | |
| *B62B 5/06* | (2006.01) | |
| *B65G 67/20* | (2006.01) | |
| *G05D 1/00* | (2006.01) | |
| *G05D 1/228* | (2024.01) | |
| *G05D 1/646* | (2024.01) | |
| *B61B 13/00* | (2006.01) | |

(56) References Cited

U.S. PATENT DOCUMENTS

| | | | |
|---|---|---|---|
| 9,108,657 B2* | 8/2015 | Hussain | B62B 5/0414 |
| 9,248,843 B2* | 2/2016 | Hathaway | B61D 3/00 |
| 10,278,877 B2* | 5/2019 | Wilson | B62B 3/003 |
| 2008/0041644 A1* | 2/2008 | Tudek | B60L 7/12 |
| | | | 180/65.1 |
| 2018/0172204 A1* | 6/2018 | Grappe | A47C 4/38 |
| 2020/0180439 A1* | 6/2020 | Chung | B62B 3/001 |
| 2021/0039702 A1* | 2/2021 | Kutsuna | B62B 3/08 |

\* cited by examiner

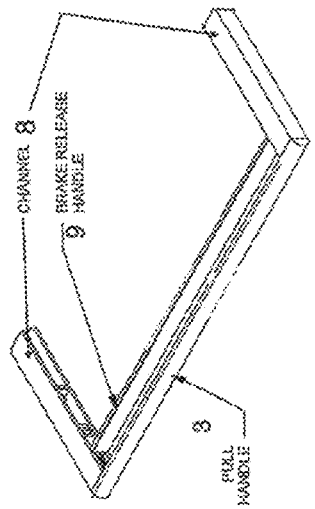
FIG. 1B DEADMAN BRAKE RELEASE HANDLE
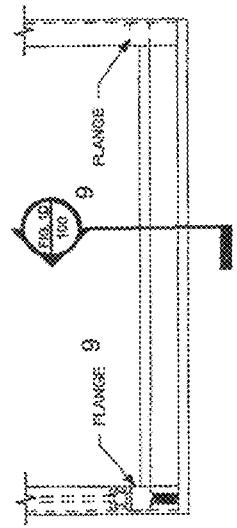
FIG. 1E PLAN VIEW DEADMAN BRAKE RELEASE HANDLE
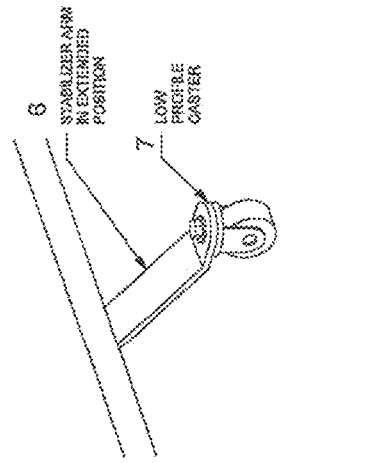
FIG. 1A STABILIZER ARM
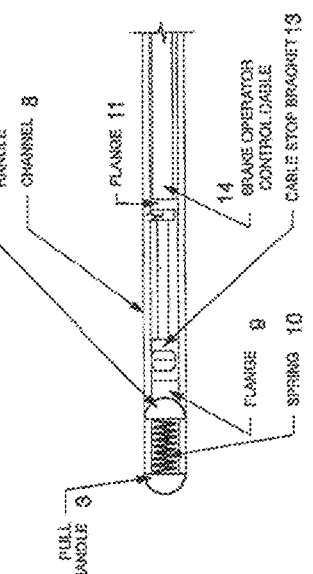
FIG. 1D DEADMAN BRAKE RELEASE HANDLE (SECTION)
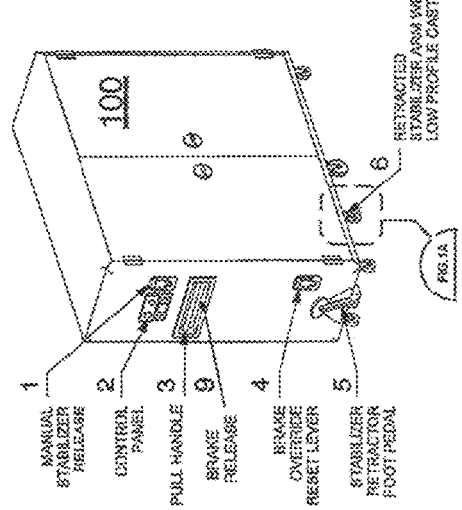
FIG. 1 AXONOMETRIC VIEW
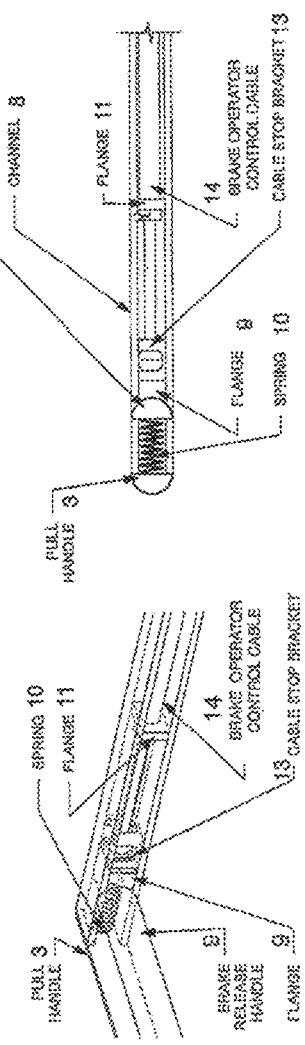
FIG. 1C DEADMAN BRAKE CABLE LINKAGE

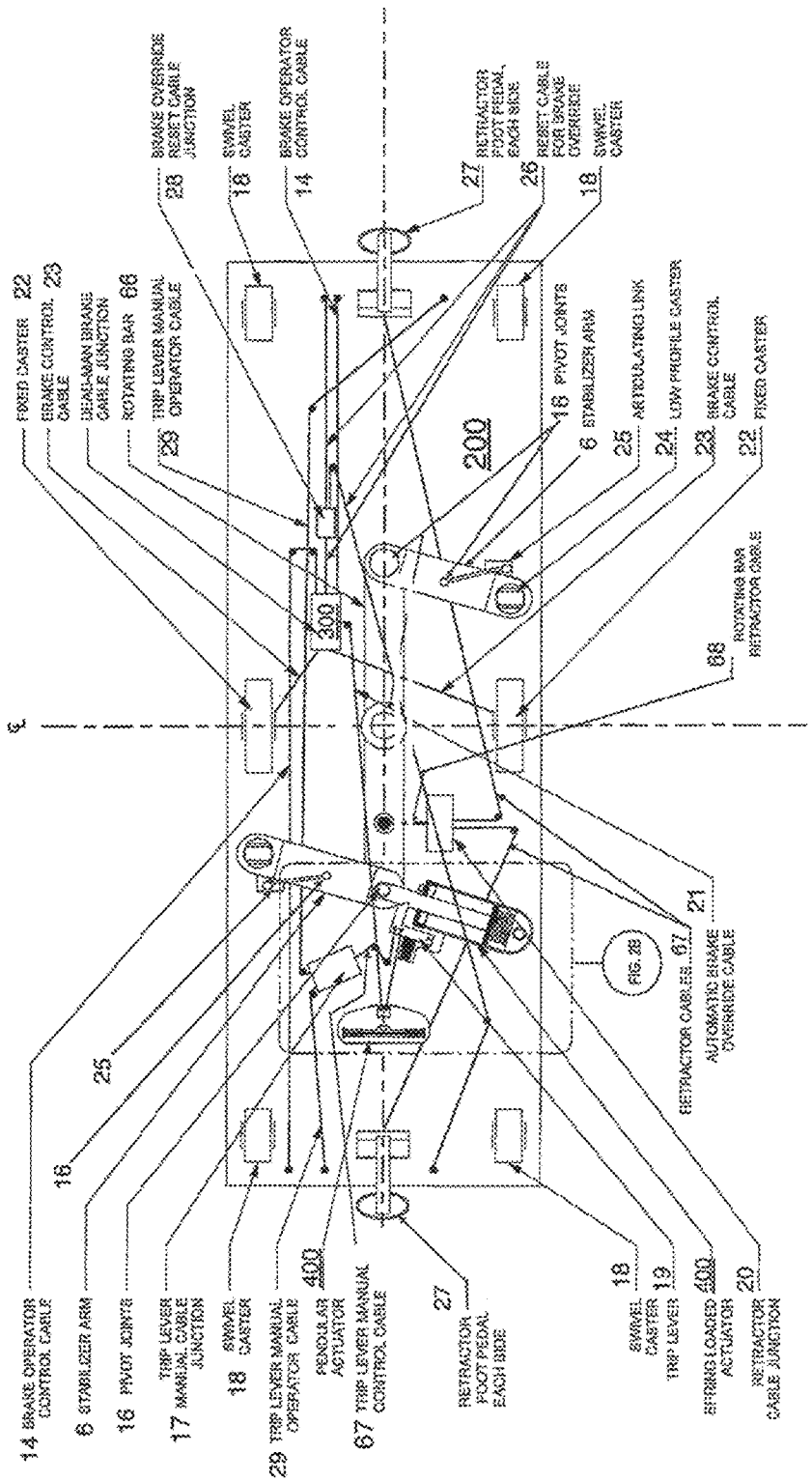
FIG. 2 REFLECTED CHASSIS PLAN WITH STABILIZER ARMS RETRACTED

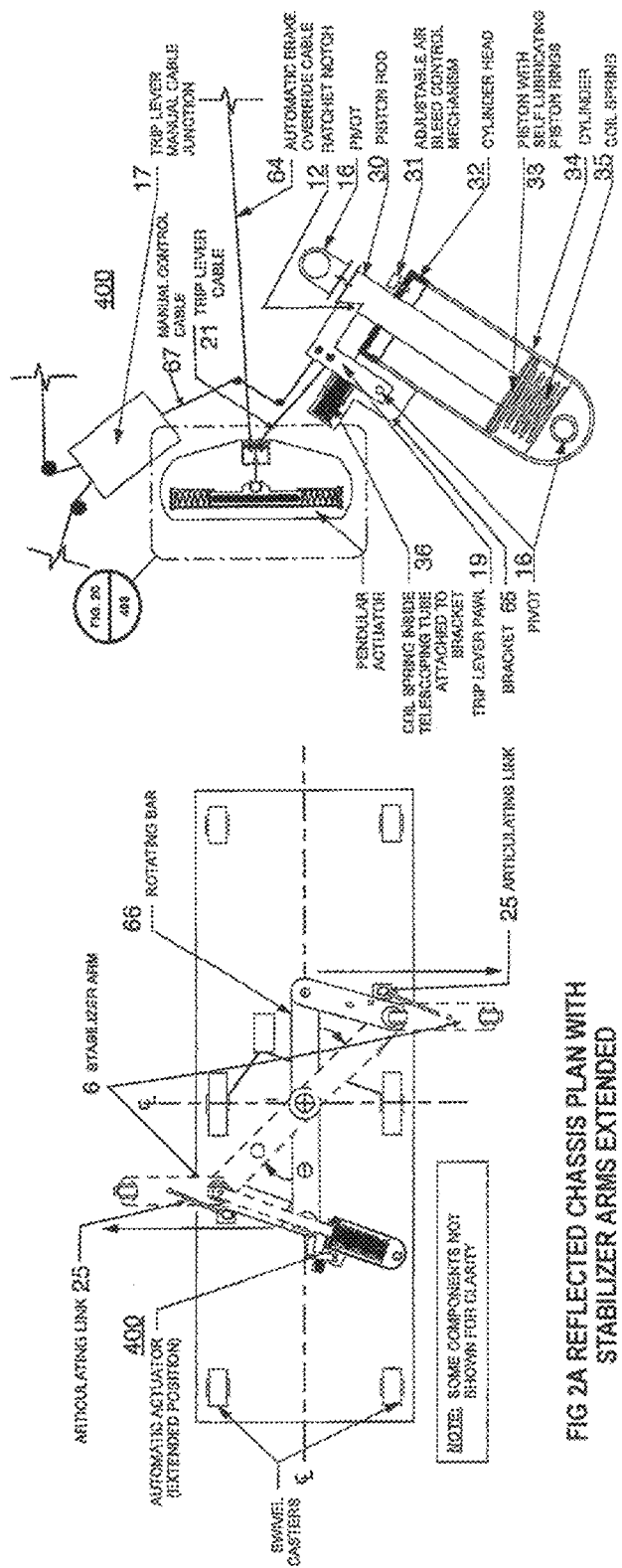
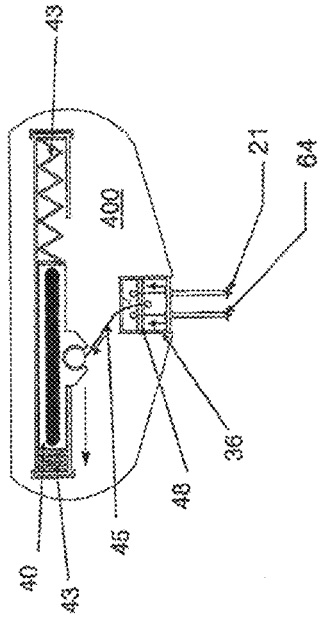
FIG. 2B STABILIZER ARM ACTUATOR
FIG. 2A REFLECTED CHASSIS PLAN WITH STABILIZER ARMS EXTENDED
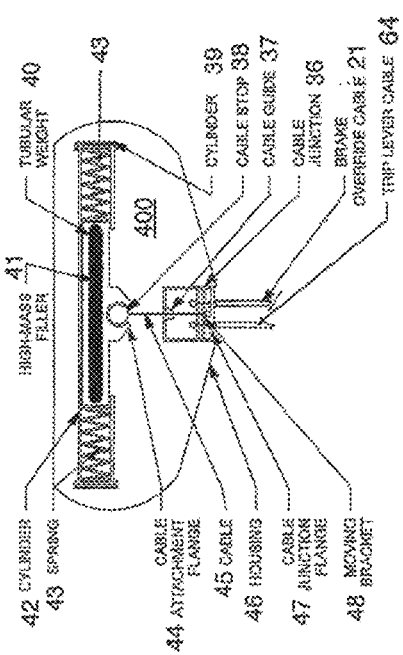
FIG. 2D PENDULAR ACTUATOR IN DEPLOYED POSITION
FIG. 2C PENDULAR ACTUATOR IN RESTING POSITION

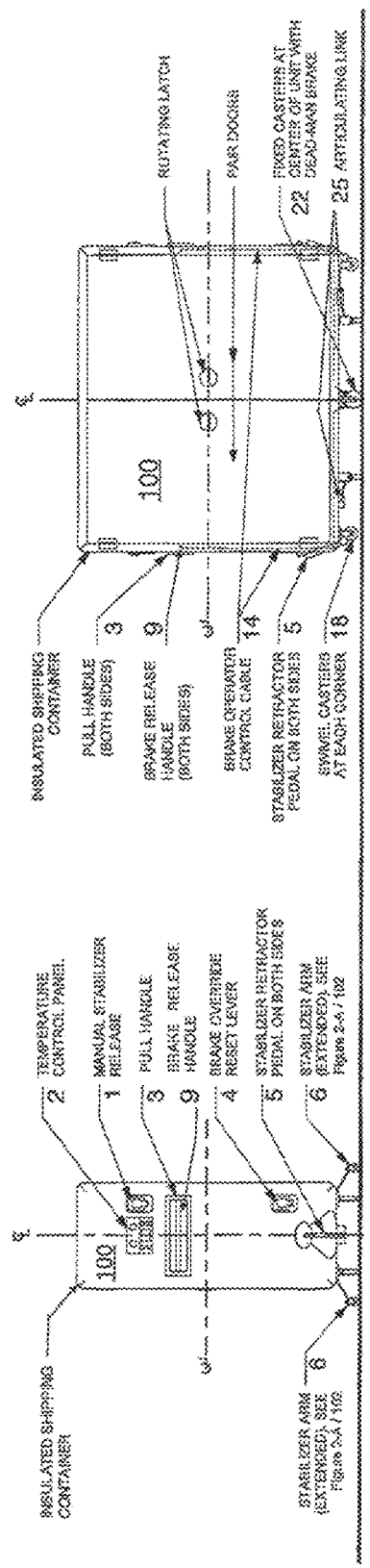

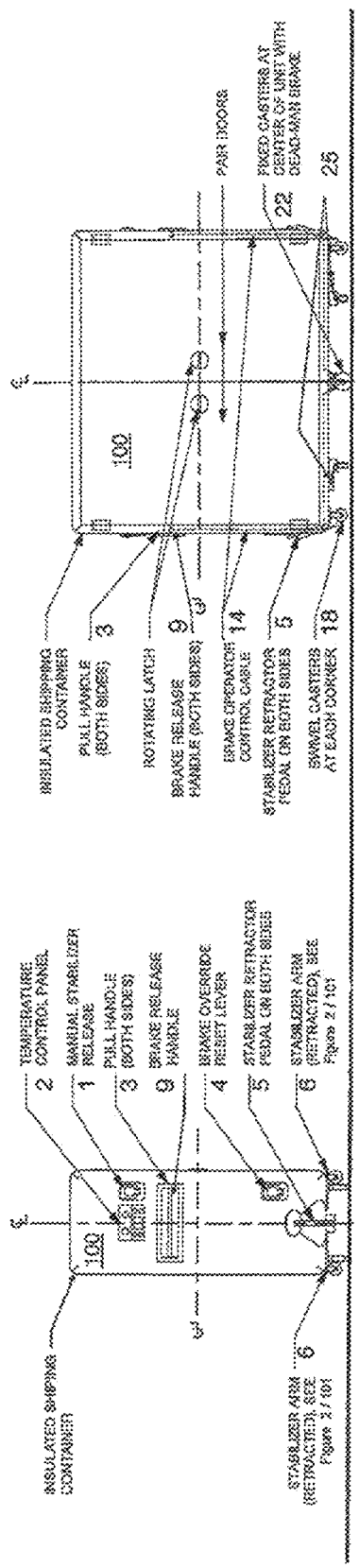

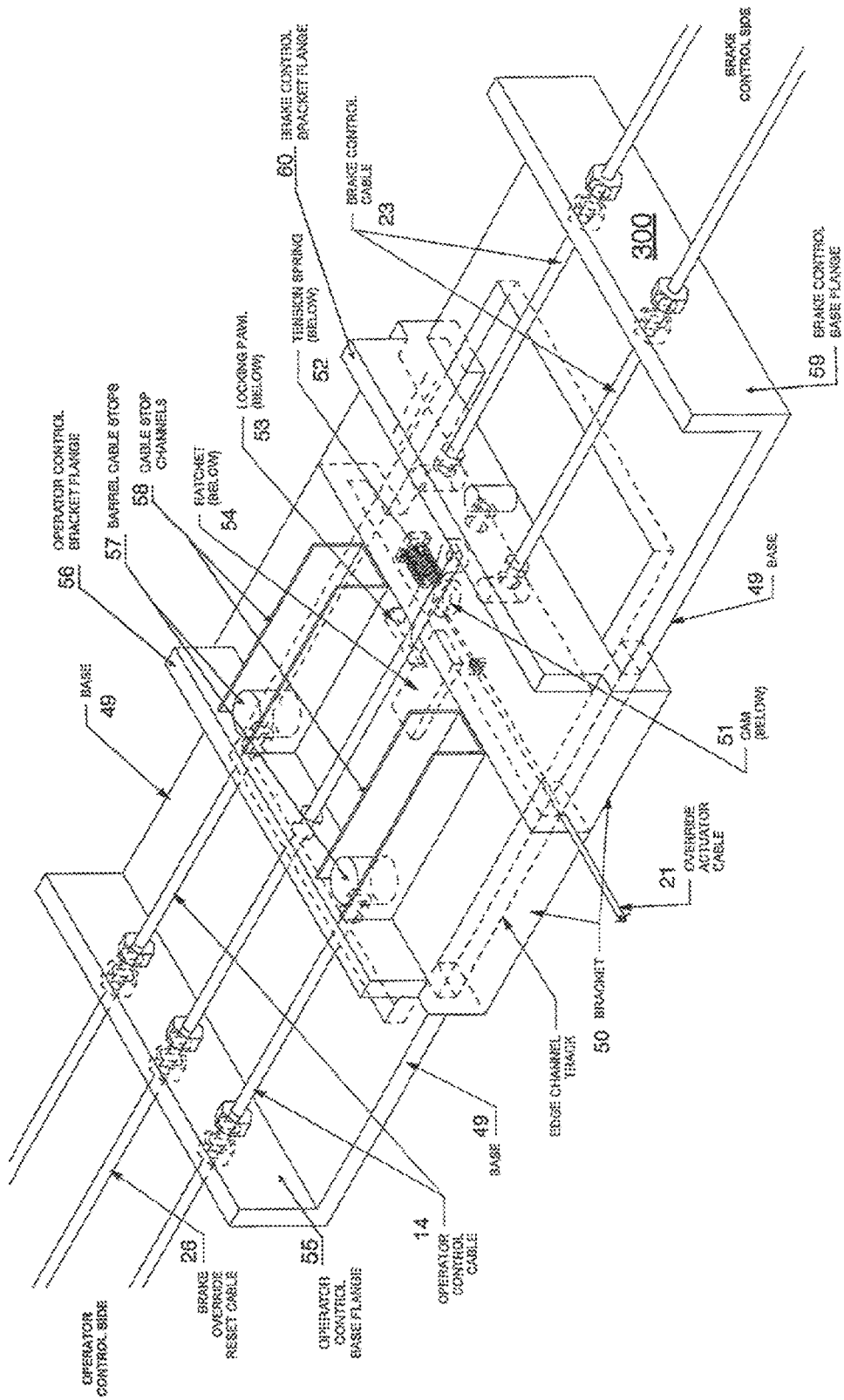
FIG. 7 CABLE CONTROL JUNCTION-BRAKES ENGAGED NORMAL OPERATION

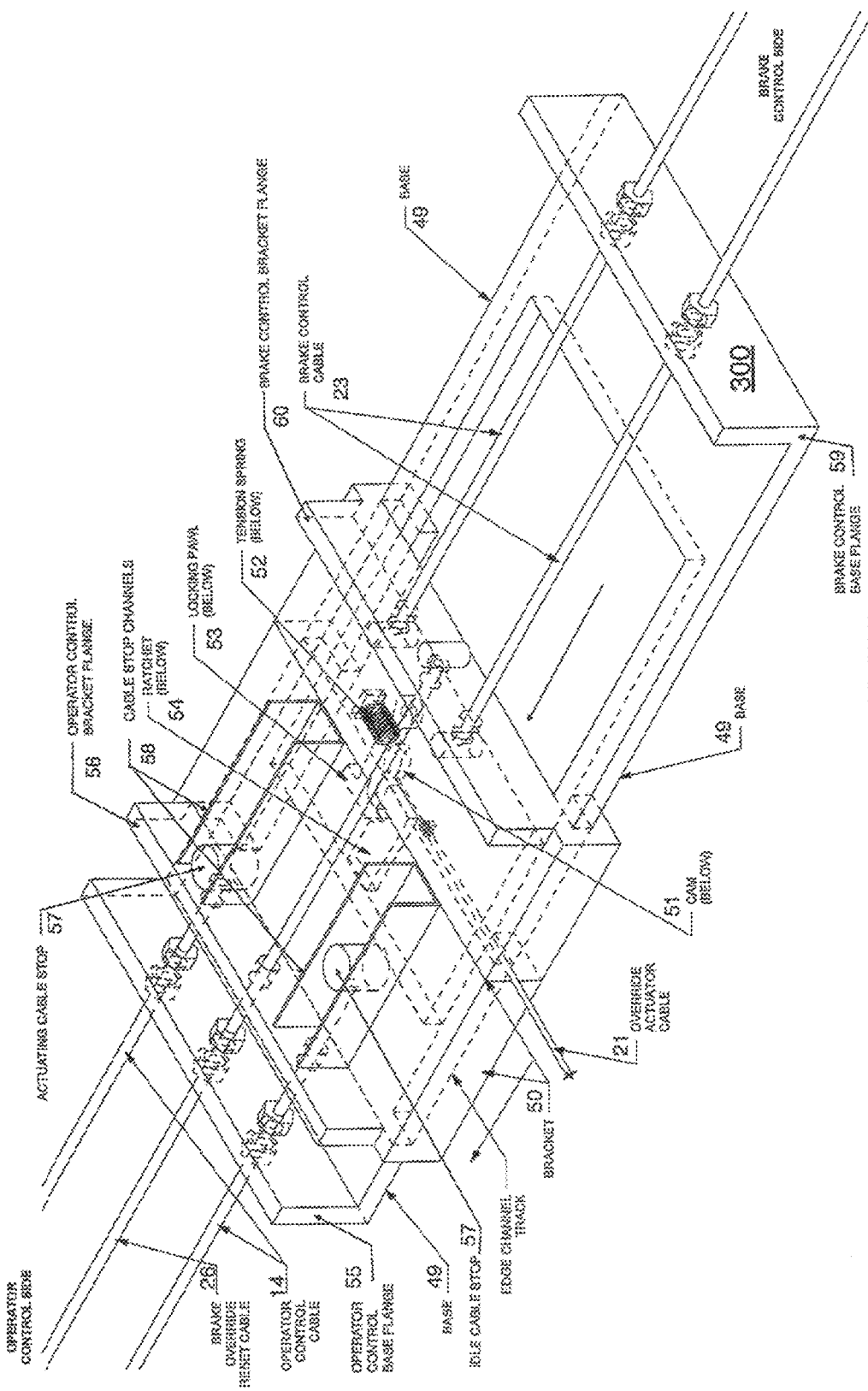
FIG. 7A CABLE CONTROL JUNCTION-BRAKES RELEASED NORMAL OPERATION

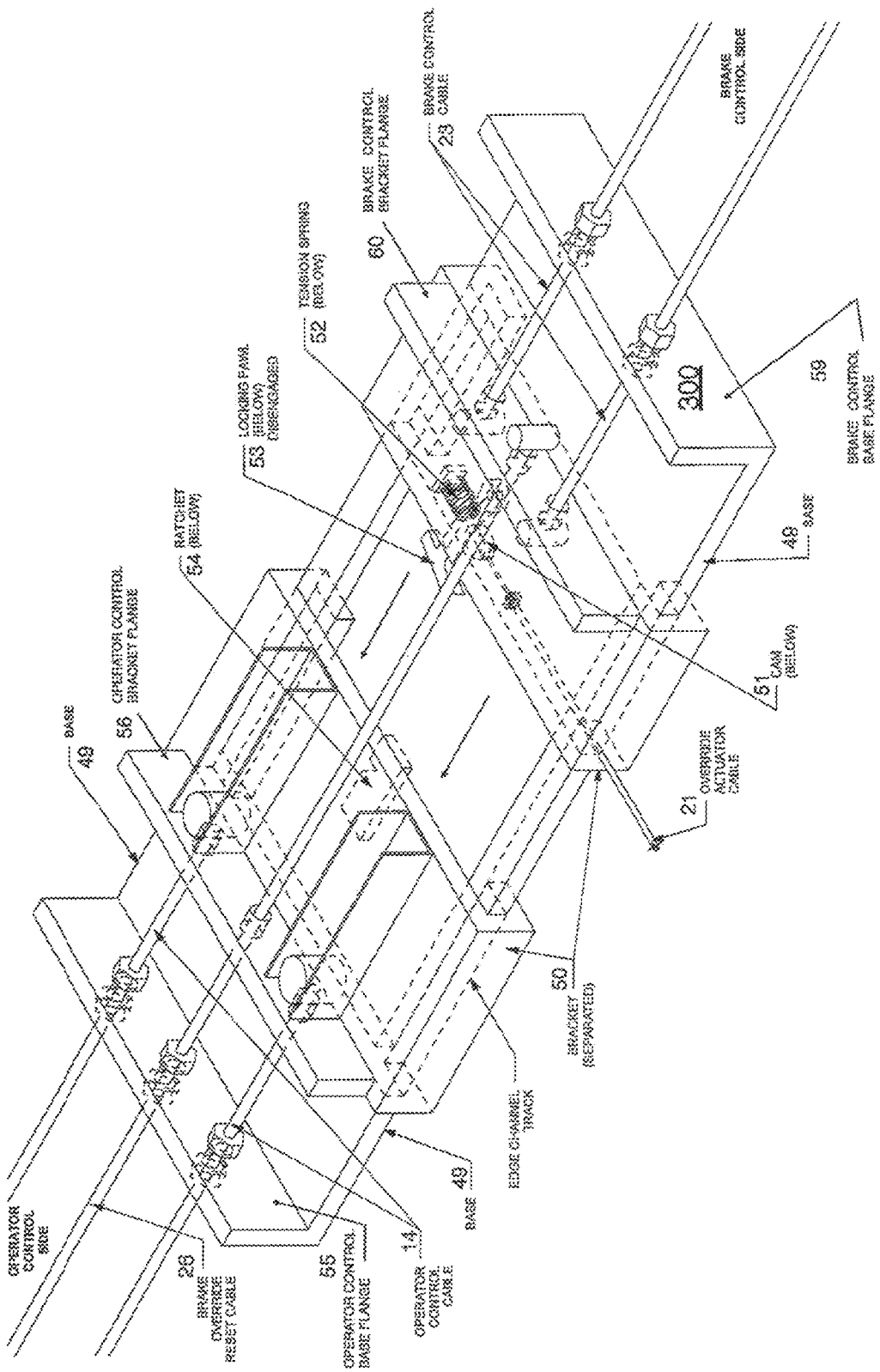
FIG. 7B MANUAL CONTROL OVERRIDE-BRAKES ENGAGED

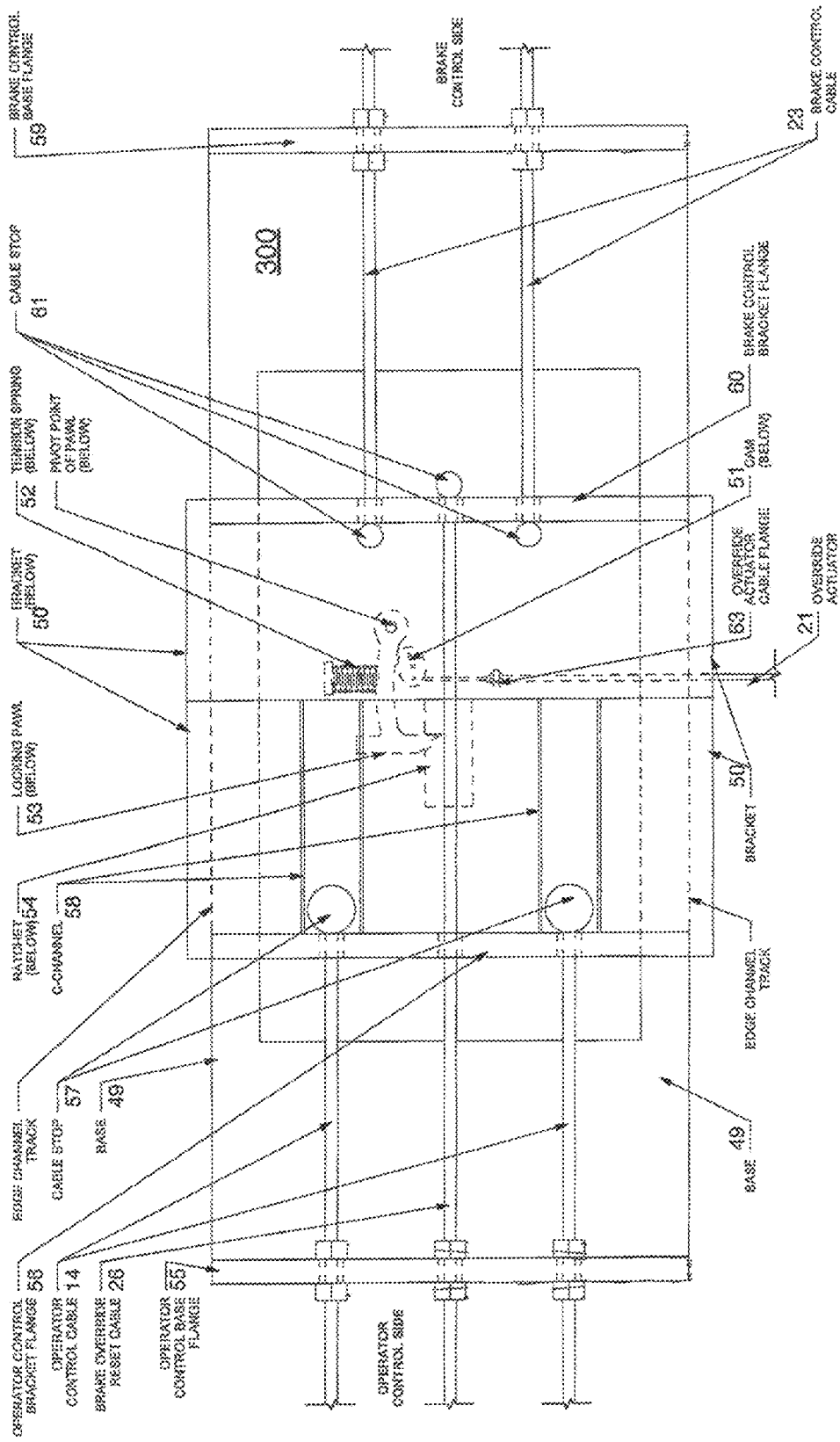
FIG. 7C PLAN VIEW - DEADMAN BRAKE CABLE JUNCTION - BRAKES ENGANGED NORMAL OPERATION

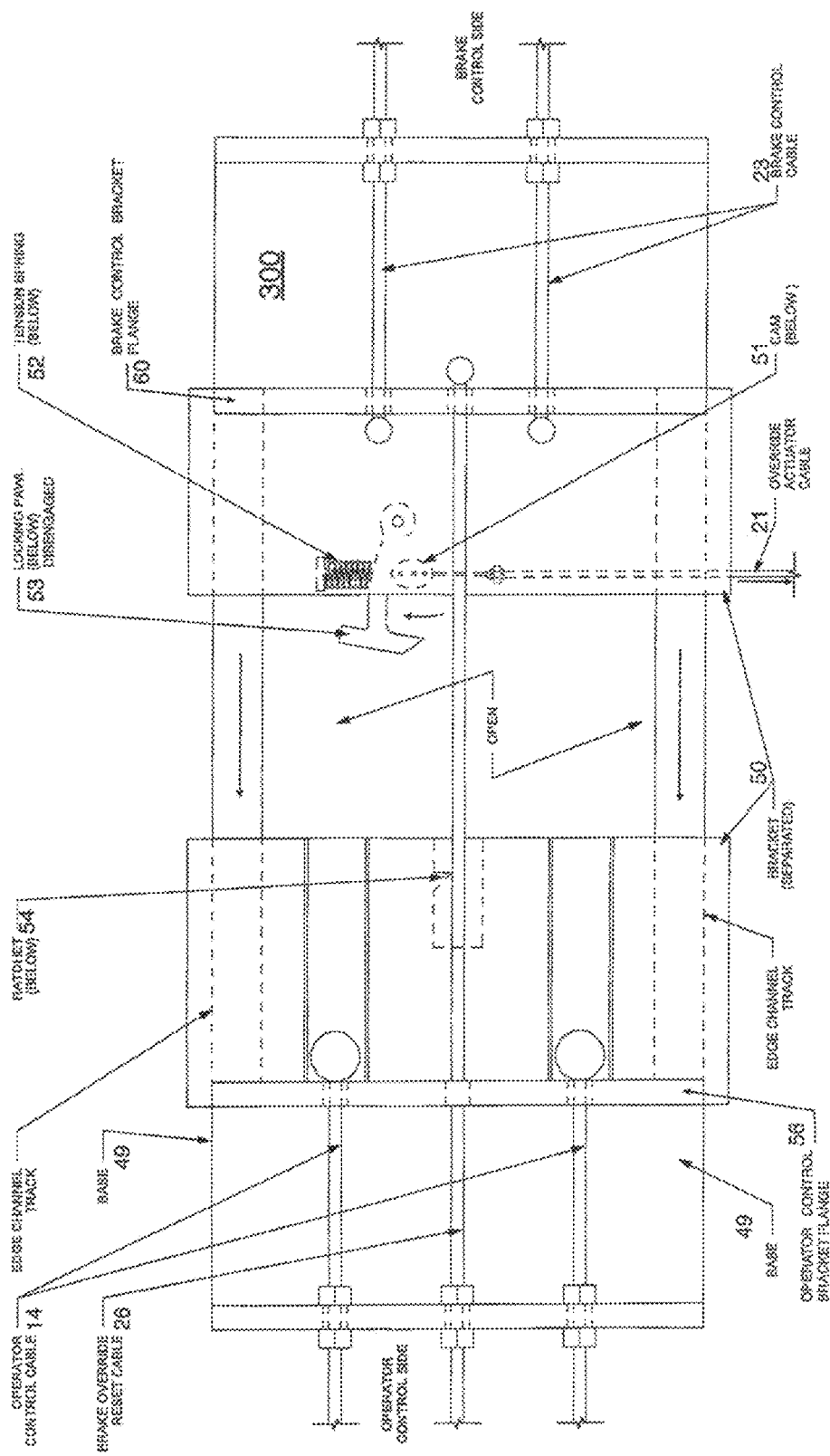

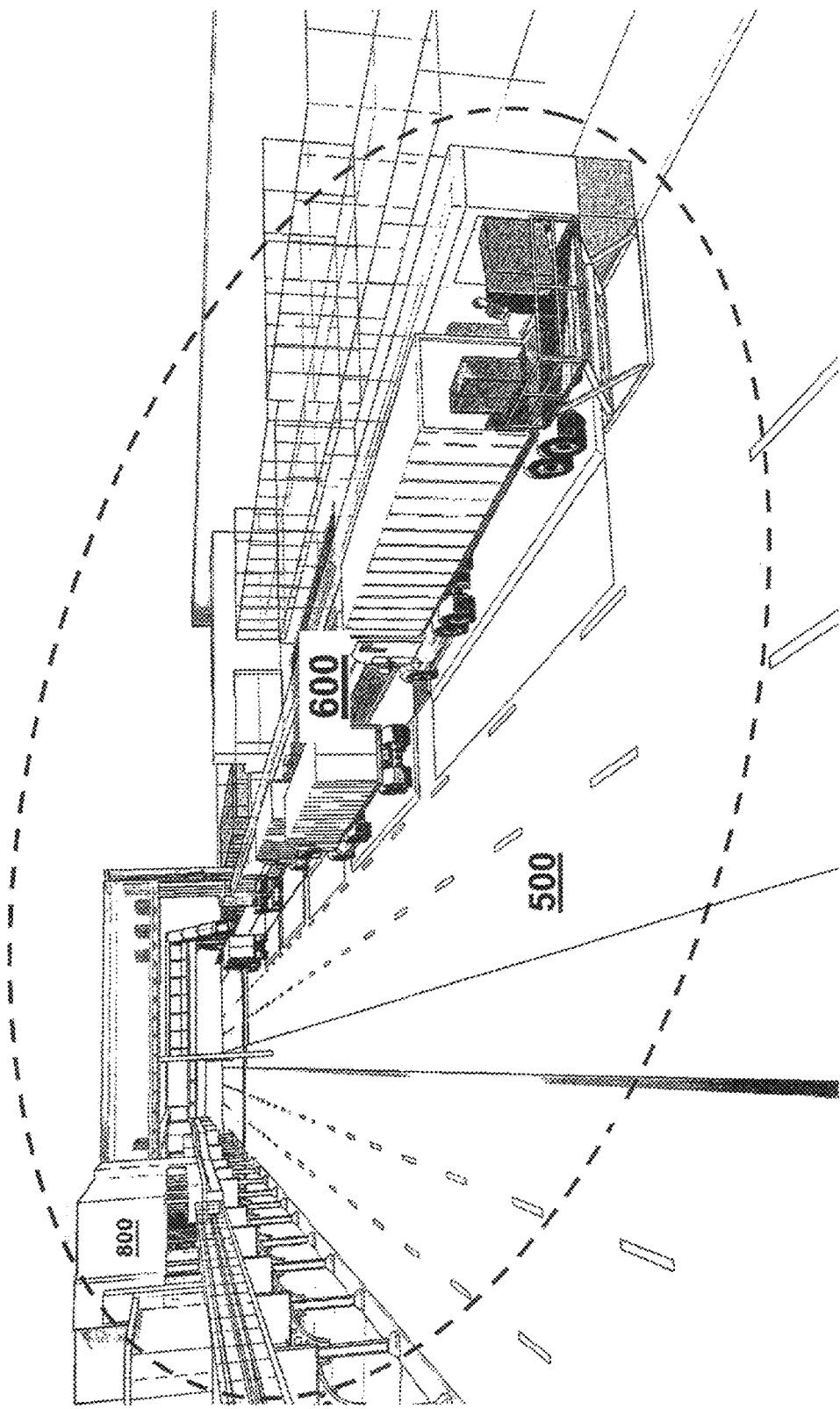
FIG. 8 OVERVIEW OF PRIMARY TRANSFER TERMINAL, LINEAR LOADING DOCK AND CONVEYOR SYSTEM, AT ELEVATED TRANSIT LINE

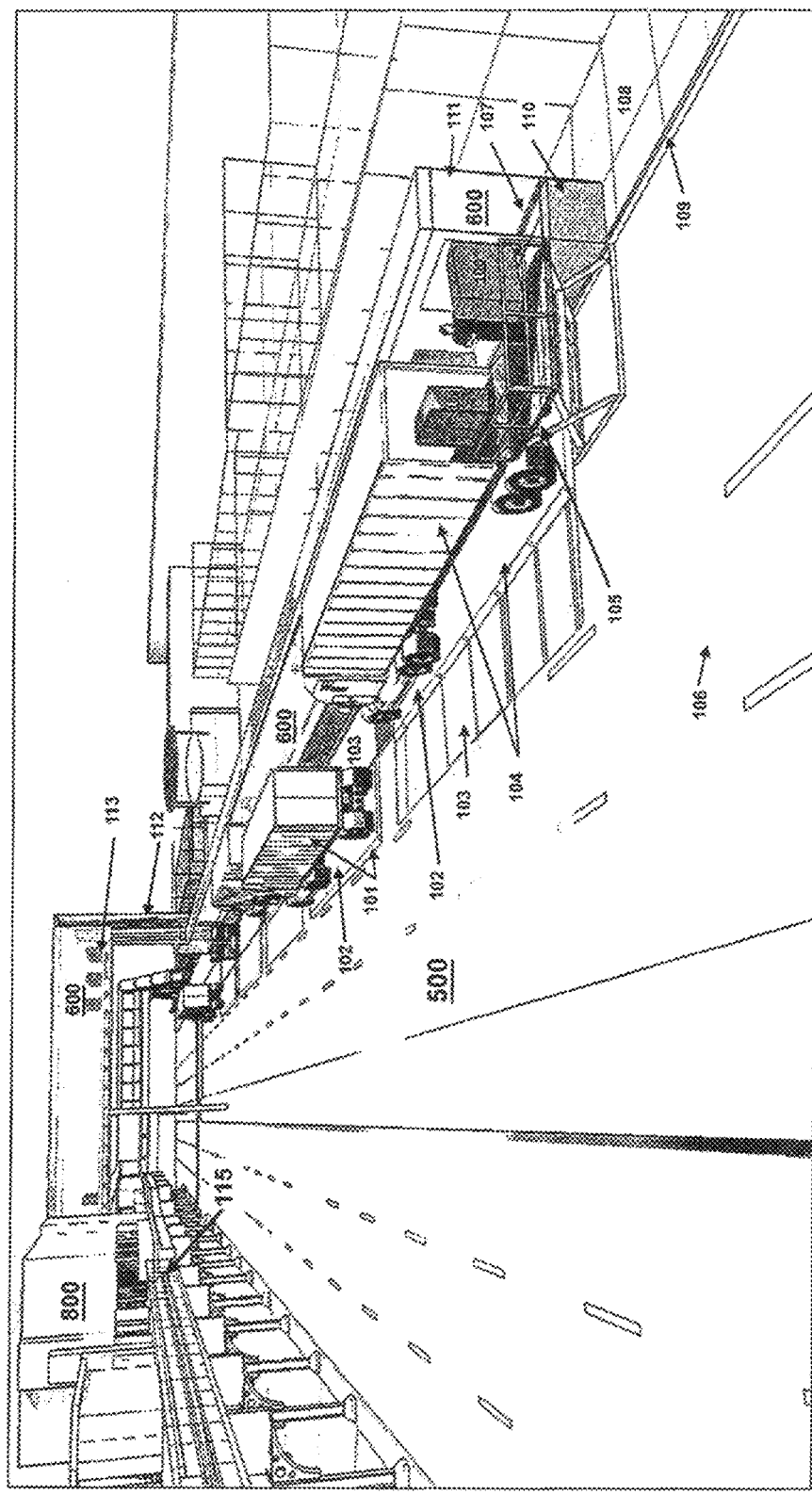
FIG. 8A PRIMARY TRANSFER TERMINAL AT ELEVATED TRANSIT LINE, LINEAR LOADING DOCK & CONVEYOR SYSTEM

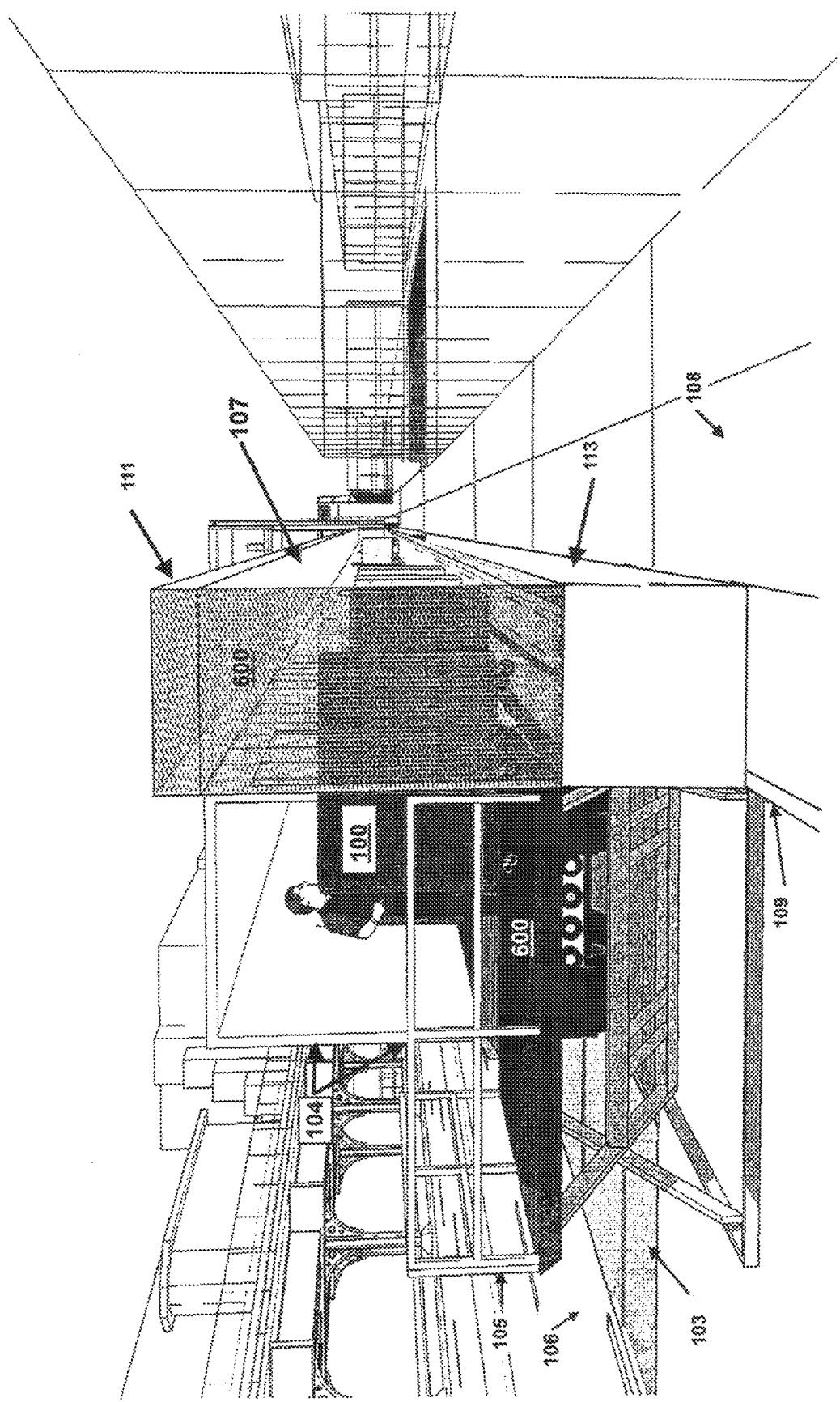
FIG. 8B DETAIL VIEW OF LINEAR LOADING DOCK, MOVABLE LOADING PLATFORM AND HORIZONTAL STREET CONVEYOR

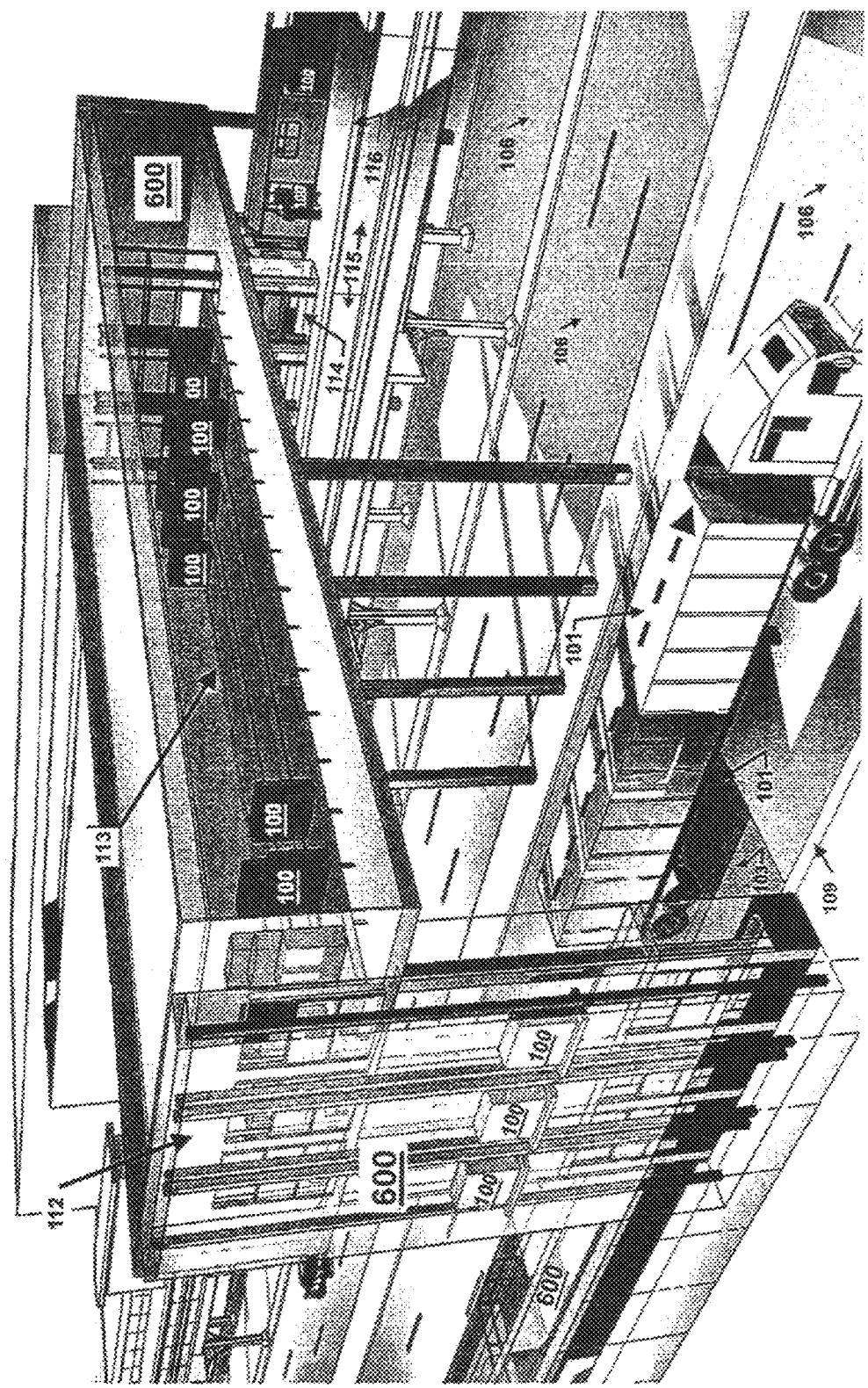
FIG. 8C DETAIL OF OVERHEAD HORIZONTAL AND VERTICAL RECIPROCATING CONVEYORS AT ELEVATED PRIMARY TRANSFER TERMINAL.

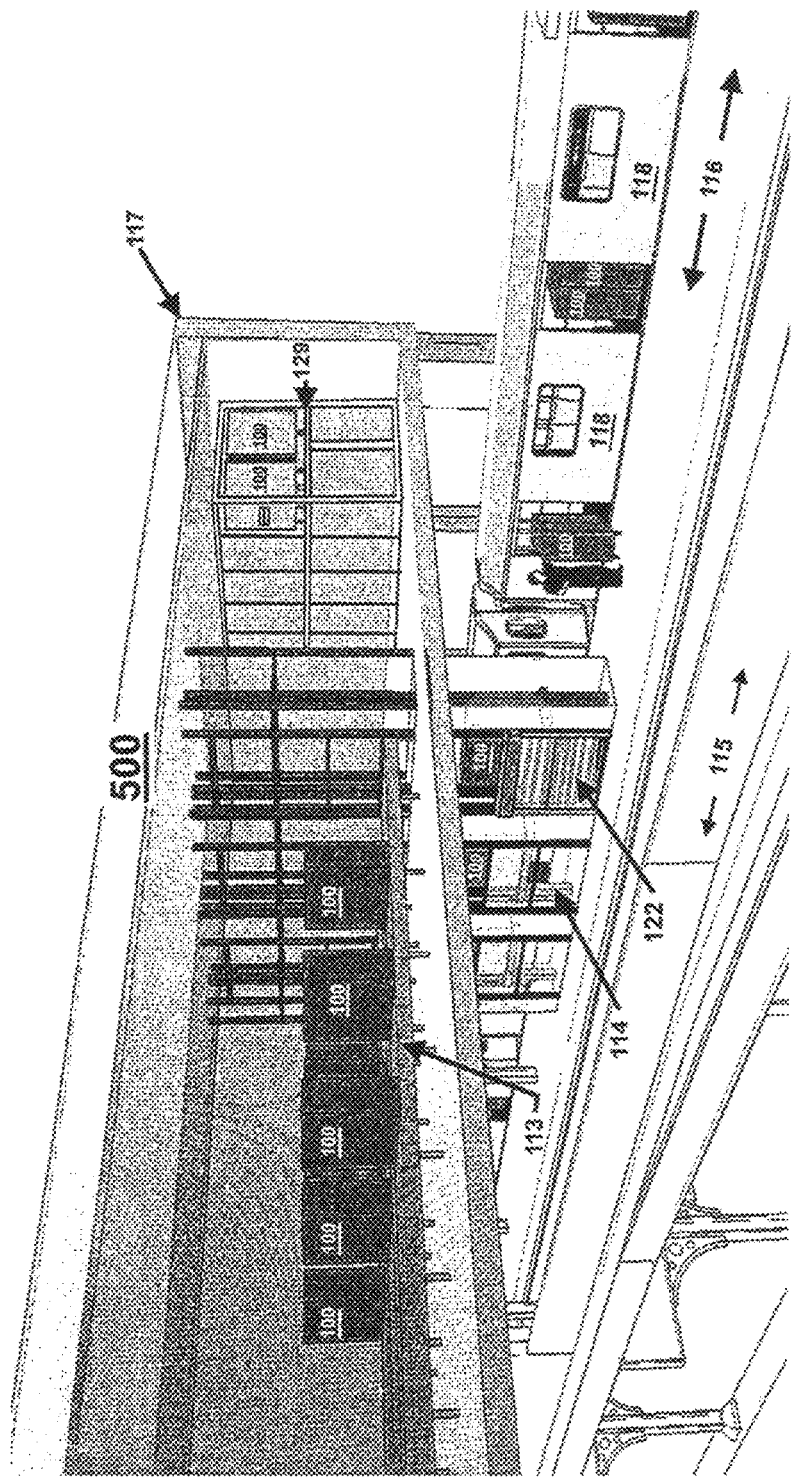
FIG. 8D DETAIL VIEW OF VERTICAL CONVEYORS AND CONTAINERS AT TRAIN PLATFORM

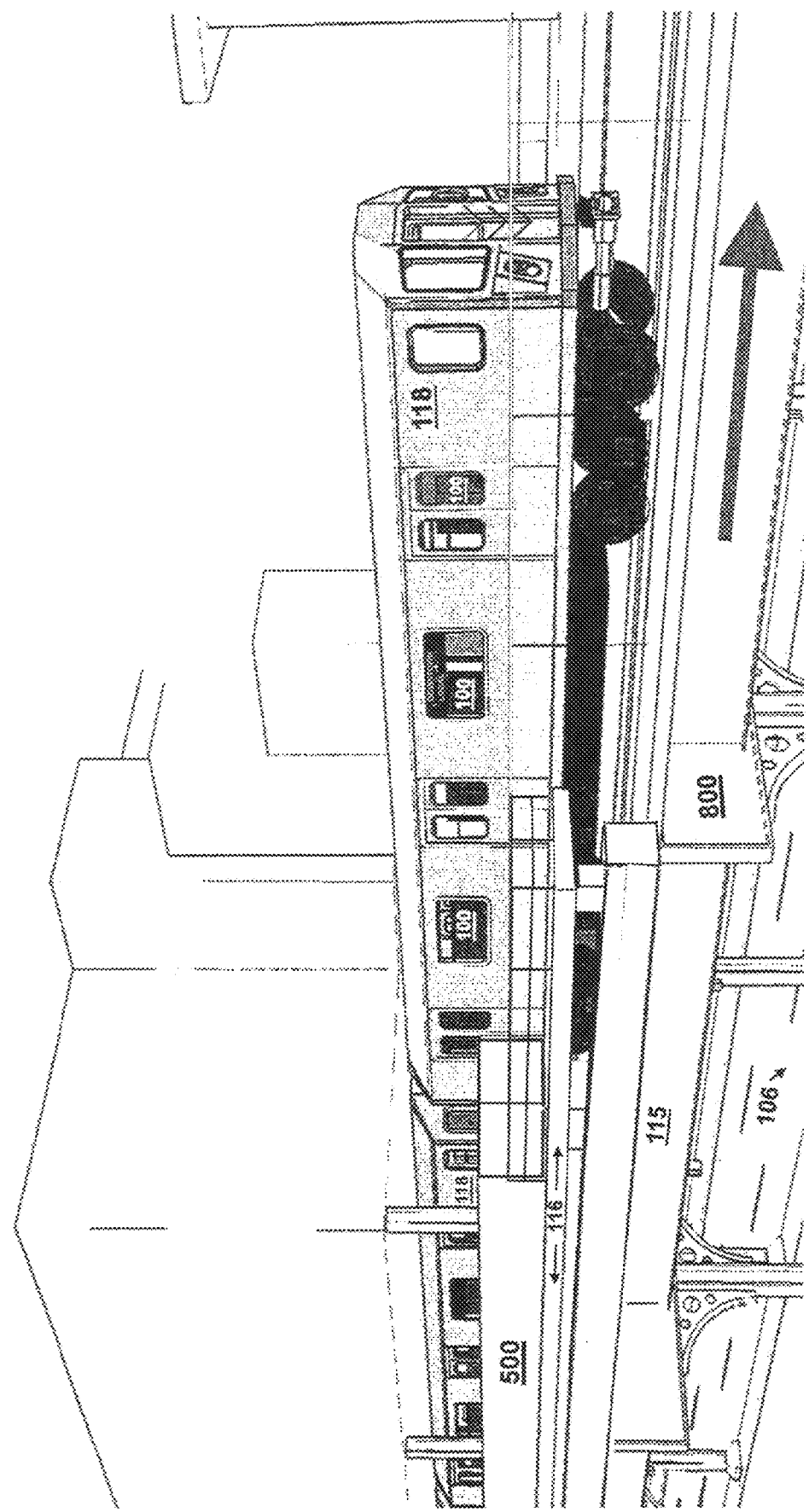
FIG. 8 E PASSENGER TRAIN TRANSPORT TO REMOTE DELIVERY & RETURN STATION

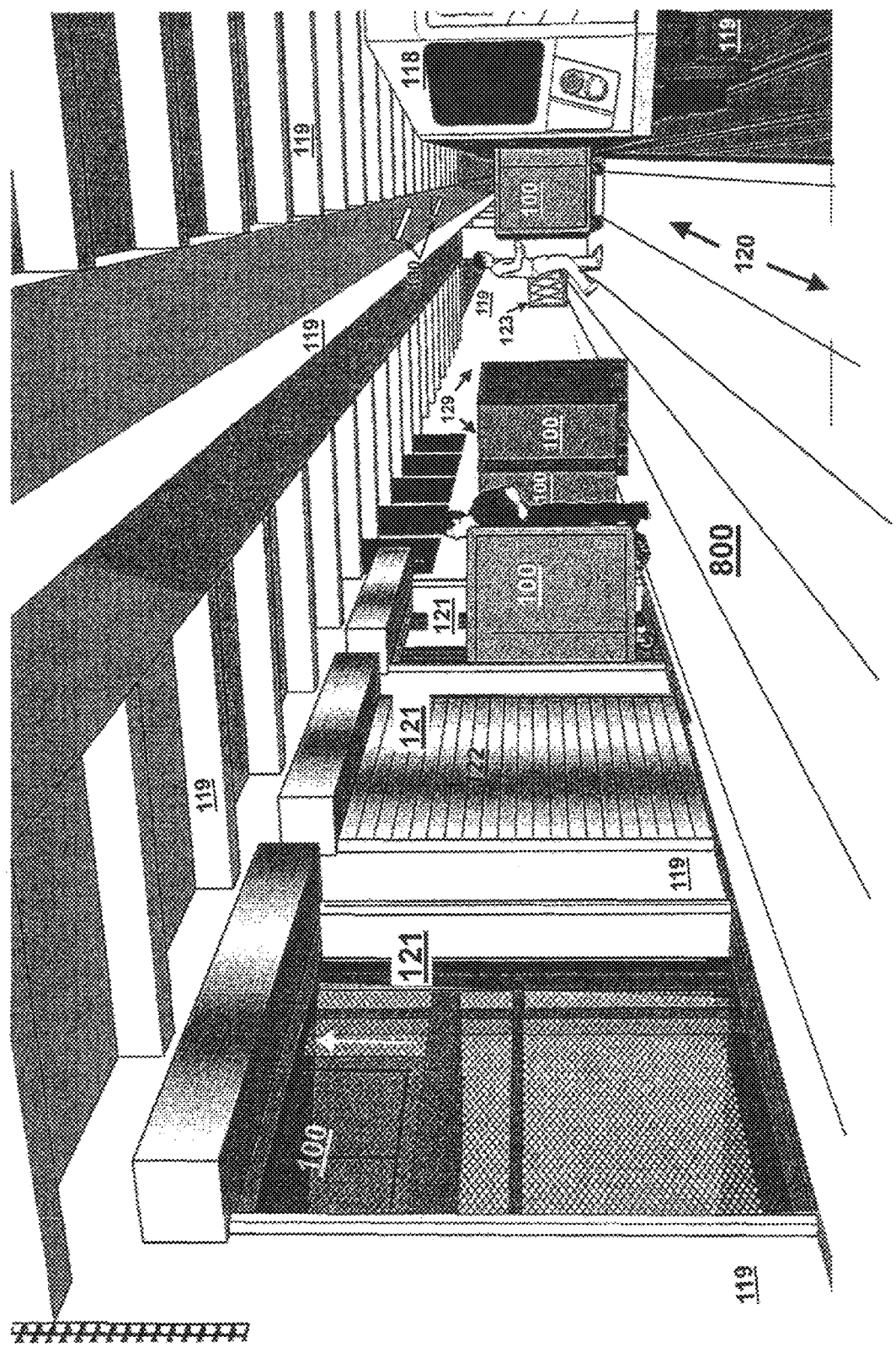
FIG. 9  BELOW GRADE REMOTE DELIVERY AND RETURN STATION

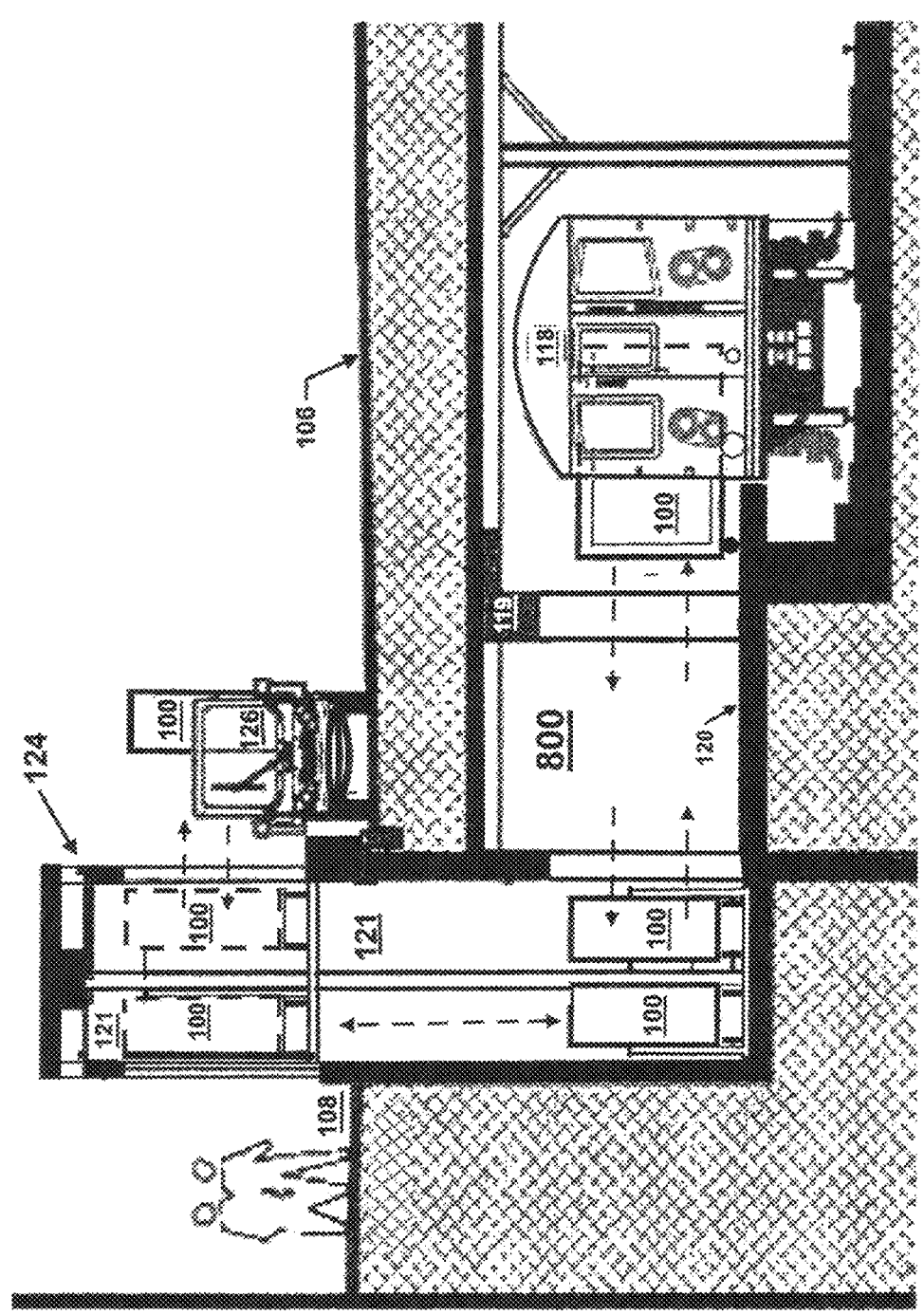
FIG. 9 A SECTIONAL VIEW OF BELOW GRADE REMOTE DELIVERY AND RETURN STATION

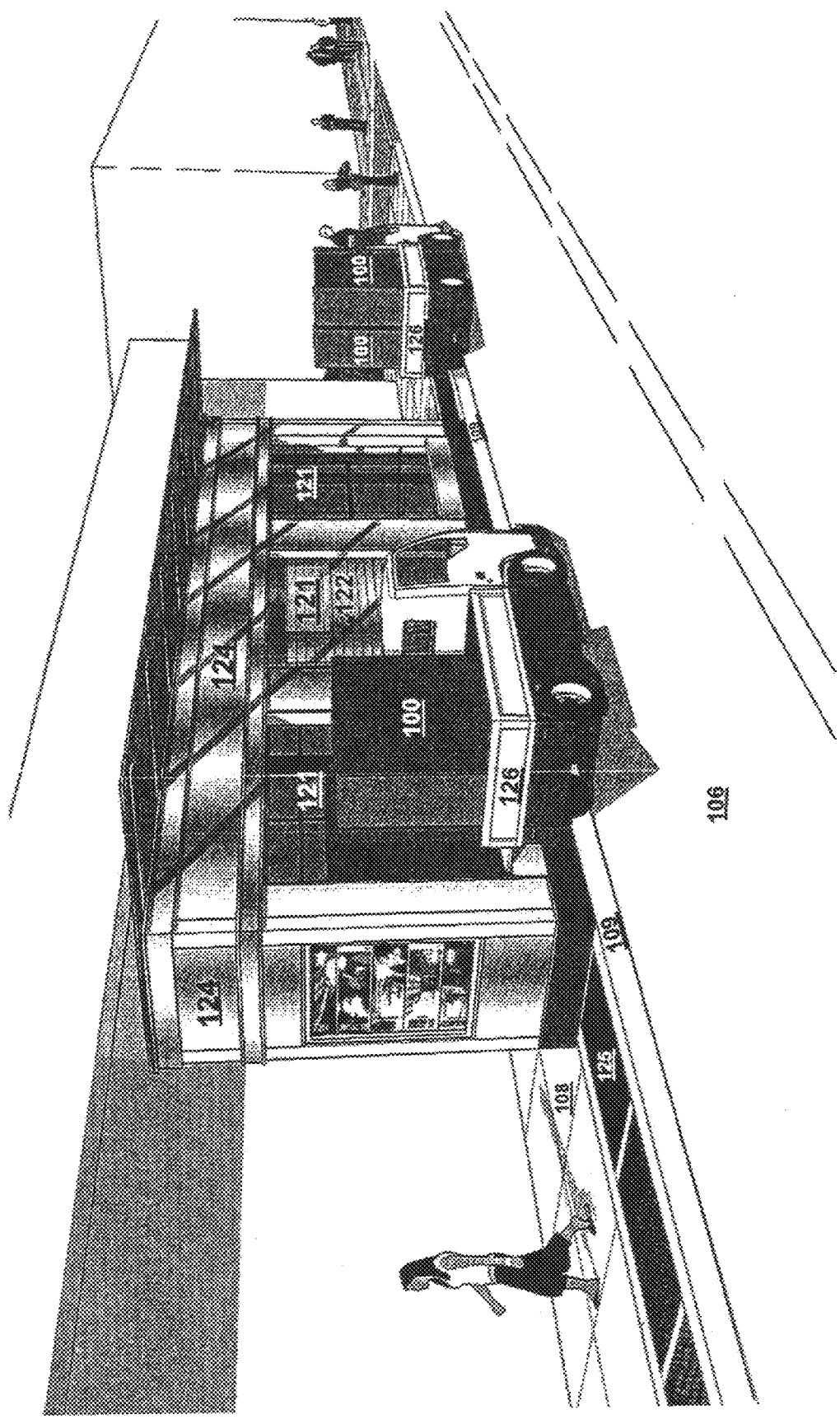
FIG. 9 B TRANSFER OF CONTAINER BETWEEN BELOW GRADE STATION AND DELIVERY LOOP VEHICLES

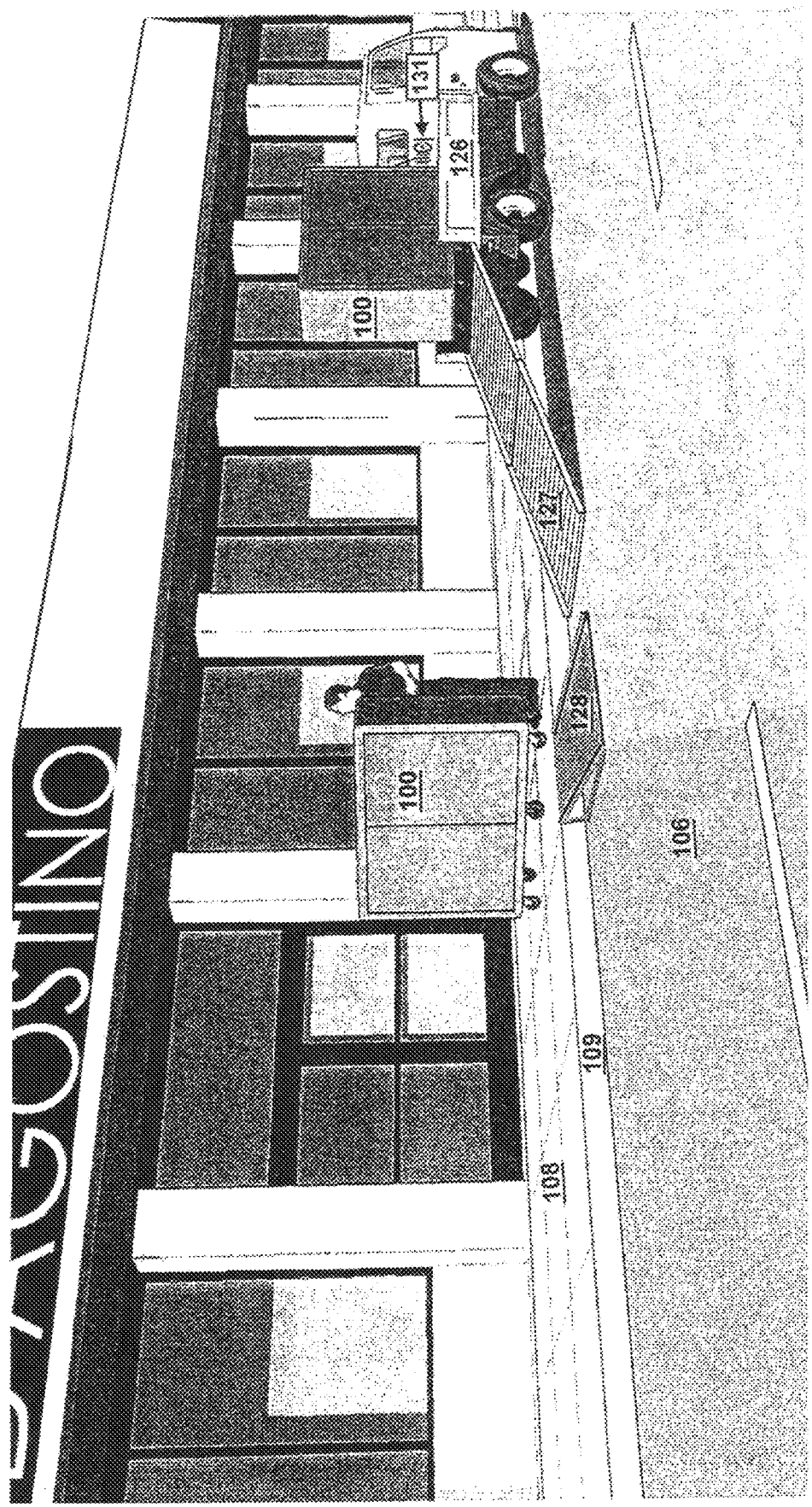
FIG. 9 C INTERMODAL CARGO CONTAINERS ARE DELIVERED AND PICKED UP FROM DESTINATION

MOBILE MOTORIZED CARGO CONTAINER WITH SELECTIVELY DEPLOYABLE CONTROL SYSTEMS

RELATED APPLICATIONS

This application is a continuation of application Ser. No. 17/981,803, which '803 application is a continuation of application Ser. No. 17/460,199, filed Aug. 28, 2021, now U.S. Pat. No. 11,535,465, dated Dec. 27, 2022, which '199 application is a continuation-in-part of application Ser. No. 17/030,323 filed Sep. 23, 2020, now U.S. Pat. No. 11,104,364 B1, issued Aug. 31, 2021, which '803, '199 and '323 applications Applicant claims priority under 35 USC 120 therefrom, and which '323 application claim priority under 35 USC 119 subparagraph "e" from provisional application No. 62/905,961 filed Sep. 25, 2019.

BACKGROUND OF THE INVENTION

Field of the Invention

The present invention relates to a method of making last mile urban deliveries in densely populated urban areas. It uses miniaturized intermodal cargo containers combined with an intermodal transportation method that leverages existing mass transit rail infrastructure to deliver urban freight without trucks having to enter the city.

The present invention relates to a system of miniature intermodal cargo containers, intermodal transfer terminals and remote delivery and receiving stations that deploy separation devices, horizontal conveyors, vertical reciprocating conveyors, communication devices, buffer storage areas, automatic storage and retrieval systems and automated handing equipment to transport miniature intermodal cargo containers via existing mass transit rail infrastructure from entry point to their final destination. The system can also be used to move the miniature intermodal cargo containers to various points within the system or return them to their origination point.

Description of the Related Art

The ability to use transit trains for shipping freight presents several unique problems. The first is that there is no practical way to efficiently move large volumes and tonnage of packages, parcels and freight via an existing mass transit rail system. The second is that there is no practical way to transport packages, parcels and freight via a mass transit rail system without interfering with the movement and safety of passengers.

Current art consist of using small hand trucks or small wheeled carts which have to be dragged and pushed up and down flights of stairs or deployed on existing passenger elevators which are severely limited in size and reliability and notably unsanitary. Current art does not allow for the separation of packages, parcels and freight ("PPF") and passengers using the mass transit rail system, creating a likelihood of interference with passenger use and risk of passenger accidents and injuries. Current art does not allow for significant volumes and tonnage of PPF to be moved via an existing mass transit rail system. Current art does not provide for PPF to transferred directly between trucks and an existing mass transit rail system. Current art does not provide a means of containerized PPF to be transported via existing vehicles and an existing mass transit rail system.

OBJECTS OF THE INVENTION

For the convenience of the reader, the following abbreviations will appear in the following paragraphs:
Packages, Parcels and Freight is abbreviated as "PPF"
Intermodal Cargo Container is abbreviated as "ICC"
Mass Transit Rail System is abbreviated as "MTRS"
Primary Transfer Terminal is abbreviated as "PTT"
Linear Loading Dock & Conveyor System is abbreviated as "LLDCS"
Remote Delivery and Receiving Station is abbreviated as "RDRS"
Vertical Reciprocating Conveyor is abbreviated as "VRC"

It is an object of the present invention to provide a system of miniature Intermodal Cargo Containers, ("ICC's") one or more Primary Transfer Terminals ("PTT's") and one or more Remote Delivery and Receiving Stations ("RDRS") to transport Packages, Parcels and Freight ("PPF") via an existing Mass Transit Rail System ("MTR").

SUMMARY OF THE INVENTION

In accordance with one embodiment of the present invention, a braking device for a cargo container is provided that is capable of being deployed simultaneously with or independently of a Stabilizer device for the cargo container by separate controls.

In another embodiment of the present invention, a Stabilizer device for a cargo container is provided that is capable of being retracted upwardly at any time during movement of the container, or deployed downward manually either when the wheel brake is applied and the container is stopped or when the wheel brake is released and the container is in motion.

In another embodiment of the present invention, a Stabilizer device for a cargo container is provided that is capable of disabling the manual dead man brake control and causing the brakes to engage simultaneously when the Stabilizer is automatically deployed.

In accordance with the general teachings of the present invention, a new and improved cargo container system is provided wherein the cargo container system includes a selectively deployable automatic wheel brake mechanism and a selectively deployable automatic Stabilizer mechanism.

That is, the wheel brake mechanism is capable of being selectively deployed by the operation of a control mechanism or automatically deployed, and the retractable Stabilizer mechanism is capable of being selectively deployed by the operation of a control mechanism or automatically deployed. The wheel brake and Stabilizer mechanism may be operated simultaneously or independently of one another. The Stabilizer mechanism is capable of being retracted upward and inward when the container is rolling on its wheels, and deployed outward and downward during stationary storage or shipment of the container (e.g. during sea, rail, truck or other means of mechanized travel) or by selective manual or automatic operation during manual transport.

At a suitable time, (e.g., the container is about to be placed on the ground or other surface for the purpose of being transported upon its wheels,) the automatic brake mechanism is released and Stabilizer mechanism may be retracted upward and inward by activating a foot pedal operated control mechanism.

It is intended that brake will operate to stop the container when the brake control mechanism is released, and it is intended that the Stabilizer mechanism may be manually deployed in such a manner as to stabilize the container when the container is stationary, or moving, or when the dead-man brake is engaged, or that it may automatically deploy at any time that the container is in danger of tipping along its longitudinal axis. When the Stabilizer mechanism deploys automatically, it also deactivates the dead man brake control causing the dead man brake to engage simultaneously.

In accordance with a preferred one embodiment of the present invention, a Primary Transfer Terminal ("PTT") substantially creates an access point between the Intermodal Cargo Containers ("IC's") and an existing Mass Transit Rail System ("MTRS")

In another embodiment of the present invention, a Linear Loading Dock and Conveyor System ("LLDCS") enables trucks of varying sizes to be automatically moved from the street to and from a conveyor system for purposes of unloading and receiving Intermodal Cargo Containers ("ICC's).

In another embodiment of the present invention, a configuration of horizontal and reciprocating vertical conveyors, provide for transfer of Intermodal Cargo Containers ("ICC's") between trucks and the Mass Transit Rail System ("MTRS").

In another embodiment of the present invention, a system of horizontal and vertical reciprocating conveyors provides for transfer of ICC's from and to the MTRS from various Remote Delivery and Receiving Stations ("RDRS") situated remotely from the PTT.

In accordance with the general teachings of the present invention, a new and improved urban delivery system is provided wherein parcels packages and freight ("PPF") may be shipped in an inbound or outbound direction via an existing Mass Transit Rail System ("MTRS"). This would be accomplished by preloading the PPF into delivery-address tagged ICC's at an off-site location and delivering the ICC's to a PTT via truck. At the PTT, a truck is automatically parked at the LLDCS where the ICC's are transferred to a conveyor system by means of a Movable Loading Platform. The conveyor system brings the ICC's to a partitioned MTRS train platform where they are transferred either by manual and/or autonomous movement to one or more reserved Passenger Train cars.

The ICC's are then transported by train to a RDRS and transferred by either manual and/or autonomous movement to a VRC, and by the VRC to a street level VRC enclosure. At the street level enclosure, the ICC is then placed on a small, pedestrian friendly, non-internal combustion powered Delivery Loop Vehicle and delivered to its destination. The same process is deployed in reverse order to return ICC's to a PTT or to transport ICC's to other connected RDRS's within the system.

(1) It is intended that the ICC's can be moving in both inbound and outbound directions to and from a PTT or from one RDRS to another RDRS in any direction at any time the UIFS is operating.
(2) It is further intended that ICC's will be transported on MTRS train cars reserved exclusively for ICC transport.
(3) It is further intended that ICC's will be transported during specific time periods, so as to minimize interference with passenger service and capacity.
(4) It is further intended that all ICC transport operations will take place in separate, secure areas that are partitioned from transit ridership.
(5) It is further intended that any ICC transport function shown at an elevated level can also occur at grade level or below grade level, and that any function shown to occur below grade level can also occur at elevated or grade level.
(6) It is further intended that the ICC handling areas may be equipped with means for automatic or manual buffer storage of ICC's in the event that immediate transport of the ICC is not available at the time it reaches a transfer point in the system.

PREFERRED EMBODIMENTS OF THE INVENTION

In accordance with a preferred embodiment of the present invention, an Urban Intermodal Freight System is provided comprising:
(1) An Intermodal Cargo Container (ICC);
(2) An existing MTRS;
(3) A Primary Transfer Terminal (PTT) preferably located at the terminus of a mass transit rail line;
(4) A LLDCS located at the PTT comprising a series of interconnected Horizontal and Reciprocating Vertical Conveyors accessing an Existing Street on one end and the MTRS Passenger Platform at its other end;
(4) An automated sensing and signaling system for ICC's at each PTT;
(5) A Buffer Storage area connected to each conveyor system;
(7) A means of tracking the Urban Intermodal Freight System containers as they move through the UIFS and between the UIFS and various destinations;
(8) A Remote Delivery and Receiving Station (RDRS);
(9) An automated sensing and signaling system for ICC's at each RDRS;
(10) Platform to Street Vertical Reciprocating Conveyors at the RDRS;
(11) A street-level enclosure for RDRS Platform to Street Reciprocating Vertical Conveyors;
(12) A fleet of small electrically powered, pedestrian friendly, manually or autonomously operated Delivery Loop Vehicles;
(13) A means of automatic or autonomous movement of ICC's between the RDRS VRC street-level enclosure and Delivery Loop Vehicles;
(14) A means of physically partitioning UIFS operations from PTT and RDRS passenger areas during UIFS operating times;
(15) Passenger Train rail cars, exclusively used for ICC transport during UIFS operating periods.

BRIEF DESCRIPTION OF THE DRAWINGS

The present invention can best be understood in connection with the accompanying drawings. It is noted that the invention is not limited to the precise embodiments shown in the following drawings, in which:

FIG. 1 is a perspective view of a cargo container 100 formed in accordance with the present invention, having a dead man wheel brake mechanism and retractable Stabilizer mechanism.

FIG. 1-A is an enlarged view of the Stabilizer arm in a deployed position.

FIG. 1-B is a detailed perspective view of one embodiment of the combined pull handle and dead man brake release handle.

FIG. 1-C is an enlarged view of one embodiment of the means of attachment of the attachment of the dead man brake operator control cable to the dead man brake release handle shown in FIG. 1-B.

FIG. 1-D is a cross-sectional view of the combined pull handle and dead man brake release handle shown in FIG. 1-B and indicated as FIG. 1-D/100 in FIG. 1-E.

FIG. 1-E is a plan view of the combined pull handle and dead man brake release handle shown in FIG. 1-B.

FIG. 2 is a bottom plan view of the cargo container of the present invention shown in FIG. 1 and illustrating the dead man brake and Stabilizer mechanisms of the container.

FIG. 2-A is a detail of the bottom plan view of the cargo container of the present invention shown in FIG. 2 illustrating the movement of the Stabilizer mechanism of the container to its deployed position.

FIG. 2-B is an enlarged view of the Stabilizer mechanism actuator, pendular actuator mechanism and trip lever mechanism, showing both manual and automatic release mechanisms of the Stabilizer mechanism shown in FIG. 2.

FIG. 2-C is an enlarged view of the pendular actuator mechanism of the Stabilizer mechanism shown in in the circled area labelled "FIG. 2-C/102" of FIG. 2-B in resting position.

FIG. 2-D is an enlarged view of the pendular actuator mechanism of the Stabilizer mechanism of the container shown in FIG. 2-B in deployed position.

FIG. 3 is a side elevational view of the cargo container of the present invention, illustrating the retractable Stabilizer mechanism in a deployed state.

FIG. 4 is a front elevational view of the cargo container of the present invention, illustrating the retractable Stabilizer mechanism in a deployed state.

FIG. 5 is a side elevational view of the cargo container of the present invention, illustrating the retractable Stabilizer mechanism in a retracted state.

FIG. 6 is a front elevational view of the cargo container of the present invention, illustrating the retractable Stabilizer mechanism in a retracted state.

FIG. 7 is a perspective view of the Dead Man Brake Control Cable Junction in its resting position with brakes engaged.

FIG. 7-1 is a perspective view of the Dead Man Brake Control Cable Junction in its deployed operating position with brakes released.

FIG. 7-2 is a perspective view of the Dead Man Brake Control Cable Junction in its operator control override position with brakes engaged.

FIG. 7-3 is a plan view of the Dead Man Brake Control Cable Junction in its resting position with brakes engaged.

FIG. 7-4 is a plan view of the Dead Man Brake Control Cable Junction in its operator control override position with brakes engaged.

FIG. 8 is a perspective overview of another embodiment for a Primary Transfer Terminal, showing a Linear Loading Dock and Conveyor System, and existing MTRS station.

FIG. 8A is a detailed perspective view of a Primary Transfer Terminal showing a Linear Loading Dock and Conveyor System 600 connecting the Existing Street 106 to an elevated mass transit railway station.

FIG. 8B is a detailed view of Linear Loading Dock and Conveyor System showing the Linear Loading Dock, Movable Loading Platform, Cargo Containers, Street Level Horizontal Conveyor, Truck and Parking Pad in curbside position, Parking Pad Travel Area and Existing Sidewalk.

FIG. 8C is a detailed view of the Linear Loading Dock and Conveyor System, showing the connections between the following elements highlighted in bold type: (1) Street Horizontal Conveyor to Street Vertical Reciprocating Conveyor (2) Street Vertical Reciprocating Conveyor to Overhead Horizontal Conveyor, (3) Overhead Horizontal Conveyor to Platform Vertical Reciprocating Conveyor and (4) Platform Vertical Reciprocating Conveyor to Elevated Train Platform. Also shown in FIG. 8C are Intermodal Cargo Containers, Parking Pad and Parking Pad Travel Area, Parking Pad in Entry/Exit Position, a Truck Exiting Parking Pad, Elevated Train Platform and Existing Street.

FIG. 8D is a detailed view of the Linear Loading Dock and Conveyor System at the Passenger Platform, showing the Overhead Horizontal Conveyors, one method of Buffer Storage and Platform Vertical Reciprocating Conveyors.

FIG. 8E shows a Passenger train carrying Intermodal Cargo Containers from a Primary Transfer Terminal to a Destination.

FIG. 9 shows a Below-Grade Remote Delivery and Return Station.

FIG. 9A shows a Sectional View of a Below Grade RDRS.

FIG. 9B shows ICC transfer between Below Grade RDRS and Existing Street.

FIG. 9C shows ICC pick-up and delivery from a delivery destination.

LIST OF REFERENCE NUMERALS

FIG. 1 Perspective View of Cargo Container
   1 Manual Stabilizer Release
   2 Control Panel
   3 Pull Handle and Brake Release Assembly
   4 Brake Override Reset Lever
   5 Stabilizer Retractor Foot Pedal
   6 Retracted Stabilizer Arm with Low Profile Caster
FIG. 1-A Deployed View of Stabilizer Arm
   6 Stabilizer Arm in Extended Position
   7 Low Profile Caster
FIG. 1-B Detail Perspective of Pull Handle and Brake Release Handle
   3 Pull Handle
   8 Channel
   9 Brake Release Handle
FIG. 1-C Enlarged Detail Perspective of Brake Release Handle
   3 Pull Handle
   9 Brake Release Handle
   9 Brake Release Handle Flange
   10 Spring
   11 Cable Mounting Flange
   13 Cable Stop Bracket
   14 Brake Operator Control Cable
FIG. 1-D Cross Section View of Brake Release Handle
   3 Pull Handle
   8 Channel
   9 Brake Release Handle
   9 Brake Release Handle Flange
   10 Spring
   11 Cable Mounting Flange
   13 Cable Stop Bracket
FIG. 1-E Plan View of Pull Handle and Brake Release Handle
   9 Brake Release Handle
   9 Brake Release Handle Flange
FIG. 2 Bottom Plan View of Cargo Container Chassis 200
   14 Brake Operator Control Cable
   6 Stabilizer Arm
   16 Pivot Joints
   17 Trip Lever Manual Control Cable Junction
   18 Swivel Caster
   67 Trip Lever Manual Control Cable
   400 Pendular Actuator
   22 Fixed Caster with Dead Man Brake 23 Brake Control Cable
300 Dead-Man Brake Cable Junction
66 Rotating Bar
29 Trip Lever Manual Operator Cable
28 Brake Override Reset Cable Junction
27 Retractor Foot Pedal
26 Reset Cable for Brake Override
25 Articulating Link
23 Brake Control Cable
21 Automatic Brake Override Cable
20 Retractor Cable Junction
400 Spring Loaded Actuator
19 Trip Lever FIG. 2-A Detail Bottom Plan View Chassis of Cargo Container
    400 Actuator in Extended Position
    6 Stabilizer Arms in Extended Position
    25 Articulating Links in Extended Position
    66 Rotating Bar in Rotated Position FIG. 2-B Stabilizer Arm Actuator Mechanism
    400 Stabilizer Arm Actuator Mechanism
    400 Pendular Actuator
    12 Ratchet Notch in Piston Rod
    16 Pivot Joint
    17 Trip Lever Manual Cable Junction
    64 Automatic Brake Override Cable
    30 Piston Rod
    31 Adjustable Air Bleed Control Mechanism
    32 Cylinder Head
    33 Piston with self-lubricating piston rings
    34 Cylinder
    35 Coil Spring
    65 Bracket
    19 Trip Lever Pawl
    36 Coil Spring in Telescoping Tube FIG. 2-C Pendular Actuator in Resting Position
    400
    64 Trip Lever Cable
    21 Brake Override Cable
    36 Cable Junction
    37 Cable Guide
    38 Cable Stop
    40 Tubular Weight
    41 High Mass Filler
    42 Cylinder
    43 Spring
    44 Cable Attachment Flange
    45 Cable
    46 Housing
    47 Cable Junction Flange
    48 Moving Bracket FIG. 2-D Pendular Actuator in Deployed Position
    400
    64 Trip Lever Cable
    21 Brake Override Cable
    43 Spring
    40 Tubular Weight
    36 Cable Junction
    45 Cable
    48 Moving Bracket FIG. 3 Shipping Container Side Elevations Stabilizer Arm Extended
    100
    1 Manual Stabilizer Release
    2 Control Panel
    3 Pull Handle
    9 Brake Release Handle
    4 Brake Override Reset Lever
    5 Stabilizer Retractor Foot Pedal
    6 Stabilizer Arm Shown in Extended Position FIG. 4 Shipping Container Front Elevations Stabilizer Arm Extended
    100
    3 Pull Handle
    9 Brake Release Handle
    14 Brake Operator Control Cable
    5 Stabilizer Retractor Foot Pedal
    18 Swivel Casters
    22 Fixed Casters with Dead Man Brake
    25 Articulating Link for Stabilizer Arm
    120 Pair Doors
    121 Rotating Door Latches FIG. 5 Shipping Container Side Elevations Stabilizer Arm Retracted
    100
    1 Manual Stabilizer Release
    2 Control Panel
    3 Pull Handle
    9 Brake Release Handle
    4 Brake Override Reset Lever
    5 Stabilizer Retractor Foot Pedal
    6 Stabilizer Arm Shown Retracted FIG. 6 Shipping Container Front Elevation Stabilizer Arm Retracted
    100
    3 Pull Handle
    9 Brake Release Handle
    14 Brake Operator Control Cable
    5 Stabilizer Retractor Foot Pedal
    18 Swivel Casters
    22 Fixed Casters with Dead Man Brake
    25 Articulating Link for Stabilizer Arm
    120 Pair Doors
    121 Rotating Door Latches FIG. 7
Dead Man Brake Cable Control Junction Brakes Engaged Normal Operation
    300
    14 Operator Control Cable
    21 Brake Override Actuator Cable
    23 Brake Control Cable
    26 Brake Override Reset Cable
    49 Base
    50 Moving Bracket
    51 Cam for Automatic Override
    52 Tension Spring for Automatic Override Locking Pawl
    53 Locking Pawl for Automatic Override
    54 Ratchet for Automatic Override
    55 Operator Control Base Flange
    56 Operator Control Bracket Flange
    57 Operator Control Cable Stops
    58 Cable Stop C-Channels
    59 Brake Control Base Flange
    60 Brake Control Bracket Flange FIG. 7-1 Dead Man Brake Cable Control Junction Brakes Released Normal Operation
    300
    14 Operator Control Cable
    21 Brake Override Actuator Cable
    23 Brake Control Cable
    26 Brake Override Reset Cable
    49 Base
    50 Moving Bracket
    51 Cam for Automatic Override 52 Tension Spring for Automatic Override Locking Pawl
53 Locking Pawl for Automatic Override
54 Ratchet for Automatic Override
55 Operator Control Base Flange
56 Operator Control Bracket Flange
59 Brake Control Base Flange
60 Brake Control Bracket Flange
FIG. 7-2 Manual Control Override-Brakes Engaged, Plan View
  300
  14 Operator Control Cable
  21 Brake Override Actuator Cable
  23 Brake Control Cable
  26 Brake Override Reset Cable
  49 Base
  50 Moving Bracket
  51 Cam for Automatic Override
  52 Tension Spring for Automatic Override Locking Pawl
  53 Locking Pawl for Automatic Override
  54 Ratchet for Automatic Override
  55 Operator Control Base Flange
  56 Operator Control Bracket Flange
  59 Brake Control Base Flange
  60 Brake Control Bracket Flange
FIG. 7-3 Brake Cable Control Junction Brakes Engaged, Plan View
  300
  14 Operator Control Cable
  21 Brake Override Actuator Cable
  23 Brake Control Cable
  26 Brake Override Reset Cable
  49 Base
  50 Moving Bracket
  51 Cam for Automatic Override
  52 Tension Spring for Automatic Override Locking Pawl
  53 Locking Pawl for Automatic Override
  54 Ratchet for Automatic Override
  55 Operator Control Base Flange
  56 Operator Control Bracket Flange
  57 Operator Control Cable Stops
  58 Cable Stop C-Channels
  59 Brake Control Base Flange
  60 Brake Control Bracket Flange
  61 Brake Control Cable and Override Reset Cable Stops
FIG. 7-4 Brake Cable Control Junction Brakes Engaged, Plan View
  300
  14 Operator Control Cable
  21 Brake Override Actuator Cable
  23 Brake Control Cable
  26 Brake Override Reset Cable
  49 Base
  50 Moving Bracket
  51 Cam for Automatic Override
  52 Tension Spring for Automatic Override Locking Pawl
  53 Locking Pawl for Automatic Override
  54 Ratchet for Automatic Override
  56 Operator Control Bracket Flange
  57 Operator Control Cable Stops
  58 Cable Stop C-Channels
  60 Brake Control Bracket Flange
FIG. 8 Overview Of Primary Transfer Terminal, Linear Loading Dock, and Conveyor System and Mass Transit Rail System
  500 Primary Transfer Terminal
  600 Linear Loading Dock & Conveyor System
  800 Mass Transit Rail System Existing Station
FIG. 8A Detail of Primary Transfer Terminal Linear Loading Dock and Conveyor System
  100 Intermodal Cargo Container
  500 Primary Transfer Terminal
  600 Linear Loading Dock & Conveyor System
  800 Mass Transit Rail System Existing Station
  101 Parking Pad and Truck in Entry/Exit Position
  102 Parking Pad
  103 Parking Pad Travel Area
  104 Parking Pad and Truck in Curbside Position
  105 Movable Loading Platform
  106 Existing Street
  107 Street Horizontal Conveyor
  108 Existing Sidewalk
  109 Existing Curb
  110 Conveyor Base
  111 Street Horizontal Conveyor Enclosure
  112 Street Vertical Reciprocating Conveyors
  113 Overhead Horizontal Conveyors
  115 Elevated Train Station
FIG. 8B Detail View of Linear Loading Dock, Movable Loading Platform and Horizontal Conveyor
  100 Intermodal Cargo Container
  103 Parking Pad Travel Area
  104 Parking Pad and Truck in Curbside Position
  105 Movable Loading Platform
  106 Existing Street
  107 Street Horizontal Conveyor
  108 Existing Sidewalk
  109 Existing Curb
  110 Street Horizontal Conveyor Base
  111 Street Horizonal Conveyor Enclosure
FIG. 8C Vertical and Overhead Reciprocating Conveyors at Linear Loading Dock
  100 Intermodal Cargo Container
  101 Parking Pad and Truck in Entry/Exit Position
  103 Parking Pad Travel Area
  106 Existing Street
  112 Street Vertical Reciprocating Conveyors
  113 Overhead Horizontal Conveyors
  114 Platform Vertical Reciprocating Conveyors
  115 Elevated Train Station
  116 Elevated Train Platform
FIG. 8D Detail View of Conveyors at Train Platform
  100 Intermodal Cargo Container
  113 Overhead Horizontal Conveyors
  115 Elevated Train Station
  116 Elevated Train Platform
  117 Overhead Horizontal Conveyor Enclosure
  118 Passenger Train
  122 Vertical Reciprocating Conveyor Security Door
  129 Automatic Storage and Retrieval System
FIG. 8E Passenger Train Transport to Remote Delivery & Return Stations
  100 Intermodal Cargo Container
  800 Mass Transit Rail System Existing Station
  106 Existing Street
  115 Elevated Train Station
  116 Elevated Train Platform
  118. Passenger Train
FIG. 9 Below Grade Remote Delivery & Return Station
  100 Intermodal Cargo Container
  800 Mass Transit Rail System Existing Station
  118 Passenger Train
  119 Existing Below Grade Transit Station
  120 Below Grade Passenger Platform
  121 Platform to Street Vertical Reciprocating Conveyors 122 Vertical Reciprocating Conveyor Security Door
123 Movable Gate
130 Sensing Device
FIG. 9A Sectional View of Below Grade of Remote Delivery & Return Station
100 Intermodal Cargo Container
800 Mass Transit Rail System Existing Station
106 Existing Street
108 Existing Sidewalk
118 Passenger Train
120 Passenger Platform
121 Below Grade to Street Vertical Reciprocating Conveyor
124 Below Grade to Surface Vertical Conveyor Enclosure
126 Delivery Loop Vehicle
FIG. 9B Container Transfer Below Grade Station to Delivery Loop Vehicles
100 Intermodal Cargo Container
106 Existing Street
121 Below Grade to Street Vertical Reciprocating Conveyors
122 Vertical Conveyor Security Door
124 Below Grade to Surface Vertical Conveyor Enclosure
125 Existing Ventilation Grate
126 Delivery Loop Vehicle
FIG. 9C Delivery and Pick Up of Containers from Delivery Destination
100 Intermodal Cargo Container
106 Existing Street
108 Existing Sidewalk
109 Existing Curb
126 Small Electric Vehicle
127 Vehicle Ramp
128 Curb Ramp
131 Winch

DETAILED DESCRIPTION OF THE PREFERRED EMBODIMENTS

The present invention has broad applications to may technical fields for a variety of product transportation modes. For illustrative purposes only, preferred modes for carrying out the invention are described herein:

I. The Cargo Container

The cargo container includes the following elements:

A cargo container 100, shown in FIGS. 1, 3, 4, 5, 6, constructed in accordance with one form of the present invention and as shown in FIGS. 1 through 7-4 of the drawings, includes a main housing defining an interior cavity for holding goods and packages, constructed of wood and/or metal or metal alloy and/or composite material and a wheel mechanism having a plurality of wheels, preferably six wheels, affixed to the bottom side of the housing, 18 and 22, shown in FIG. 2. More specifically, the wheel mechanism includes a first pair of wheels, separated from each other and situated in the corners of bottom side of the housing at one narrow side thereof, a second pair of rear wheels, separated from each other and situated in the corners of bottom side of the housing at the opposite narrow side thereof 18, shown in FIGS. 2, 4, 6. and a third pair of middle wheels, separated from each other and situated on the bottom side of the housing near the wide sides thereof 22, shown in FIG. 2. Preferably, each wheel of the first pair of wheels and each wheel of the second pair of wheels is a wheel that rotates 360 degrees and has a diameter which is preferably about three inches to about five inches in diameter, 18, shown in FIGS. 2, 4, 6. Preferably, each wheel of the third pair of middle, wheels 22, shown in FIG. 2, rotates on a fixed axle so that it rotates only in a forward and rearward direction with respect to the housing, and is larger in diameter than each wheel of the first and second pairs of front and rear wheels, and preferably has a diameter of between about six inches and about eight inches. Accordingly, the cargo container rests and rolls primarily on the third pair of middle wheels, and either the first pair of wheels or the second pair of wheels that are provided as ancillary wheels for stability and to enable the container to rotate about the vertical axis of the third pair of middle wheels, i.e. steer, and partially rotate on the horizontal axis of the middle wheels in order to traverse changes in elevation or gaps in its path.

II. The Stabilizer Mechanism

The Stabilizer mechanism includes the following elements:

(1) A rotating bar 66 shown in FIGS. 2 and 2-A, attached by means of a central pivot 16 to the intersection of the longitudinal and transverse centerlines of the chassis.

(2) A vertical pivot 16 shown in FIGS. 2 and 2-A at either end of the rotating bar.

(3) A pair of Stabilizer arms 6, shown in FIGS. 1, 2, 2-A, 3, 4, 5, 6, each attached by a pivot joint 16 to the pivot pin of the rotating bar on one end, shown in FIGS. 2, 2-A, and attached by a pivot joint 16 to an articulating link 25 shown in FIGS. 2, 2-A at a point between the rotating bar and its outward end.

(5) A low-profile caster 7 shown in FIGS. 1, 1-A, 2 and 2-A, 3, 4, 5, 6 attached to the outward end of each Stabilizer arm.

(6) Articulating links 25 shown in FIGS. 2, 2-A mounted to the chassis by means of a fixed bracket with a pivot joint 16 shown in FIGS. 2 and 2-A and attached to each Stabilizer arm by a sliding pivot joint to a point in the Stabilizer arm 6 shown in FIGS. 2 and 2-A located between the attachment to the rotating bar 66 shown in FIGS. 2, 2-A and the outward end of the Stabilizer arm, 6 shown in FIGS. 2 and 2-A.

(7) A mechanically powered actuator 400 shown in FIGS. 2, 2-A and 2-B, including a cylinder with one open and one closed end 34, shown in FIG. 2-B and a cylinder head attached to the open end 32, shown in FIG. 2-B with a concentric opening for the piston rod 30 shown in FIG. 2-B, a piston 33 shown in FIG. 2-B, with one or more self-lubricating piston rings, a coil spring, 35 shown in FIG. 2-B, located between the piston and the closed end of the cylinder 34 shown in FIG. 2-B, a piston rod, 30 shown in FIG. 2-B connected to the piston, 33 shown in FIG. 2-B on one end and to a pivoting joint 16 shown in FIG. 2-B on the rotating bar 66 shown in FIG. 2-A on the opposite end, an adjustable air bleed control mechanism in the cylinder head including an air valve to regulate the piston speed by restricting movement of air displaced by the piston, 31 shown in FIG. 2-B, and a pivot joint attached to the fixed end of the cylinder and attached to the container chassis, 16 shown in FIGS. 2, 2-A, 2-B.

(8) A spring-loaded trip lever release mechanism for the actuator 19 shown in FIGS. 2, 2-A, 2-B including a coil spring inside a telescoping tube 36 shown in FIG. 2-B attached to the trip lever mounting bracket 65 shown in FIGS. 2, 2-A, 2-B, to hold the trip lever pawl in the ratchet notch of the piston rod 12 shown in in FIG. 2-B to restrain the piston of the stabilizer arm actuator against the tension of the coil spring 35 shown in FIG. 2-B when actuator is not being operated automatically or manually.
(9) A trip lever manual control cable junction 17 shown in FIGS. 2, 2-B.
(10) A trip lever manual control cable 67 shown in FIG. 2, connecting the manual control cable junction 17 to the trip lever 19 shown in FIGS. 2, 2-B.
(11) Manual control levers 1 located on either narrow side of the container shown in FIGS. 1,3,5.
(12) Manual control actuating cables 29 shown in FIG. 2, connected to levers 1 on either narrow side of the container on shown in FIGS. 1, 3, 5, and to the manual control cable junction 17 at the other end, shown in FIGS. 2, 2-B
(13) An automatic, pendular actuated linkage 400 shown in FIG. 2, 2-B, 2-C, 2-D, connected to by a trip lever cable 64 to the trip lever release mechanism shown in FIGS. 2, 2-B.
(14) A low-profile caster 7 shown in FIGS. 1, 1-A, 3, 4, 5, 6, mounted at the end of each Stabilizer bar.

II. Trip Lever Release Mechanism

A trip lever release mechanism for the actuator including the following elements:
1. A bracket attached to or integrally made as part of the cylinder head or cylinder body, parallel to the longitudinal axis of the cylinder, 65 shown in FIG. 2-B, containing a pivot joint located near the portion of the bracket farthest from the cylinder head, 16 shown in FIG. 2-B.
2. A trip-lever pawl attached to the bracket at the pivot joint, 19 shown in FIG. 2-B.
3. Provisions on the trip lever pawl for attaching actuating cables from the pendular actuator 400 shown in FIGS. 2, 2-B and trip lever manual control cable junction 17 shown in FIGS. 2, 2-B.
4. A ratchet-notch located on the piston rod 30 shown in FIG. 2-B. in alignment with the trip-lever pawl 19 shown in FIG. 2-B.
5. A telescoping enclosure containing a tension spring 36 shown in FIG. 2-B, attached to the bracket 65 shown in FIG. 2-B.
6. A tension spring 36 shown in FIG. 2-B within the telescoping structure situated to apply pressure upon the trip lever pawl 19 shown in FIG. 2-B to keep it engaged with the ratchet-notch of the piston rod 12 shown in FIG. 2-B, in resting position, i.e. when not being actuated by the automatic pendular or manual controls.

Operation of the Trip Lever Release Mechanism

In its resting position, the trip lever release mechanism is held against the piston rod by the tension spring, causing the trip lever pawl 19 shown in FIG. 2-B to engage with the ratchet notch 12 shown in FIG. 2-B in the piston rod, 30 shown in FIG. 2-B, causing the actuator to remain in the retracted position shown in FIGS. 2, 2-B.

When the automatic pendular actuator 400 shown in FIG. 2-B or the manual control cable junction 17 shown in FIG. 2, 2-B activate their respective attached cables, 21, 67 shown in FIG. 2-B, the trip lever pawl is pulled back on its pivot to disengage from the piston rod, as shown in FIG. 2-A, releasing the Stabilizer actuator to its deployed position.

Retracted Position of the Stabilizer Mechanism

In the retracted position, the rotating bar 66 shown in FIG. 2, is rotated in alignment with the longitudinal centerline of the container, and the attached ends of the stabilizer arms 6 shown in FIG. 2, are positioned toward the longitudinal center line of the container chassis 200 shown in FIG. 2. Simultaneously, the articulating link 25 shown in FIGS. 2, 2-A, 4, 6, rotates in an upward and inward arc from its chassis-mounted pivot, causing the stabilizer arm 6 shown in FIG. 2, to move upward toward the underside of the chassis. The attached Stabilizer arm 6 is retracted and lifted upward and moves inward to a position above the fixed casters 22 shown in FIGS. 2, 5, 6.

Deployed Position of the Stabilizer Mechanism

In a deployed position, the rotating bar 66 shown in FIGS. 2, 2-A is rotated in a direction perpendicular to the longitudinal centerline of the container shown by dotted lines in FIG. 2-A, causing the attached ends of the Stabilizer arms 6 shown in FIGS. 2, 2-A to move in an outward direction shown by dotted lines in FIG. 2A. Simultaneously, the articulating link 25 shown in FIGS. 4, 6 rotates in a downward are from its chassis-mounted pivot, causing the Stabilizer arm to move downward toward the ground as it moves outward, until the caster touches the ground shown in FIGS. 1-A, 2-A, 3, 4.

IV. Automatic Operation System of the Stabilizer Mechanism

The automatic operation system of the Stabilizer mechanism includes the following elements:
(1) A mechanically powered actuator 400 shown in FIGS. 2, 2-A and 2-B, including a cylinder 34 with one open and one closed end, shown in FIG. 2-B and a cylinder head 32 attached to the open end shown in FIG. 2-B with a concentric opening for the piston rod 30 shown in FIG. 2-B, a piston 33 shown in FIG. 2-B, with one or more self-lubricating piston rings, a coil spring 35 located between the piston and the closed end of the cylinder shown in FIG. 2-B, a piston rod 30 connected to the piston 33 on one end and to a pivoting joint 16 on the rotating bar on the opposite end shown in FIG. 2-B, an adjustable air bleed control mechanism in the cylinder head 31 including an air valve to control the movement of air displaced by the piston, shown in FIG. 2-B and a pivot joint 16 attached to the fixed end of the cylinder and attached to the container chassis shown in FIGS. 2, 2-A, 2-B.
(2) A trip lever release mechanism for the actuator 19 shown in FIGS. 2, 2-A, 2-B.
(3) An automatic pendular actuator 400 shown in FIGS. 2, 2-B, 2-C, 2-D connected to the trip-lever release mechanism.

V. Automatic Pendular Actuator

An automatic pendular actuator including the following elements:
1. A housing 46 shown in FIG. 2-C including metal or composite material, attached to or incorporated within the chassis of the container, including the following parts and/or mechanisms:
2. A cylindrical tubular weight, 40 shown in FIG. 2-C including a hollow metal or composite pipe filled with lead or other suitable substance of sufficient mass 41 shown in FIG. 2-C.
3. A cable attachment flange 44 shown in FIGS. 2-C, 2-D formed of a metal or composite material with a means for attaching the automatic pendular actuated cable, 45 shown in FIG. 2-C, 2-D, attached to a tubular cylindrical weight on its exterior circumference, along its longitudinal axis and centered between the ends of the weight.
4. A round cylinder 42 shown in FIGS. 2-B, 2-C, 2-D with a bore larger in diameter than the tubular weight, closed on either end, having a longitudinal slot beginning at the center line of the longitudinal axis and extending for a specified distance on either side of the center line so that the cable attachment flange of the tubular weight extends through the longitudinal slot, to a point outside the wall of the cylinder and is able to move freely within the slot.

5. A friction reducing surface, and/or lubricant, and/or coating and/or agent at the contact points between the tubular weight 40 and cylindrical housing 42 shown in FIG. 2-C.

6. A pair of coil springs 43 shown in FIGS. 2-B, 2-C, 2-D, placed between the ends of the tubular weight and the ends of the cylindrical housing with sufficient force to center the tubular weight in the housing when the container is level, but to allow movement of the tubular weight to either end of the cylinder when the container tips beyond a specified degree.

7. A one-cable to two-cable junction 47 shown in FIG. 2-C, with a flared cylindrical guide 37 shown in FIG. 2-C mounted to the housing, centered with the longitudinal slot of the cylinder and at the mid-point of the longitudinal axis of the housing.

8. A single cable, 45 shown in FIG. 2-C attached to the cable attachment flange of the tubular weight by a cable stop 38 shown in FIG. 2-C on one end, routed through a flared tubular guide 37 shown in FIG. 2-C and attached to the moving bracket of the cable junction 48 shown in FIG. 2-C, 2-D on the other end.

9. A Trip lever 64 cable shown in FIG. 2-C, 2-D and brake override cable 21 shown in FIG. 2-C, 2-D are attached by their housings to a stationary cable junction flange 47 shown in FIGS. 2-B, 2-C, and by cable stops to the moving bracket of the cable junction 48 shown in FIGS. 2-C, 2-D. The trip lever cable is connected at its opposite end to the trip lever pawl 19 shown in FIG. 2-B of the Stabilizer arm actuator, and the brake override cable connected at its opposite end to the automatic brake override mechanism of the dead man brake control cable junction 300 FIGS. 2, 7, 7-1, 7-2, 7-3, 7-4.

VI. Automatic Deployment Operation of the Stabilizer Mechanism

The housing of the Pendular Actuator 400 shown in FIG. 2, is mounted on the bottom of the container, in an orientation parallel to the floor of the container with the longitudinal axis of the Actuator in alignment with the transverse axis of the container shown in FIG. 2. If during movement of the container, the container rotates greater than a certain permissible degree about its longitudinal axis, the tubular weight 40 shown in FIGS. 2-C, 2-D will be displaced by gravitational force and move along its housing, until it reaches the end of its travel as shown in FIG. 2-D. Simultaneously the pendular actuated cable 45 shown in FIGS. 2-C, 2-D attached to the tubular weight will be pulled in the direction of travel as shown in FIG. 2-D. The cable 45 will exert a pulling force on the moving bracket 48 in turn pulling the attached trip lever cable 64 connected to the trip lever of the Stabilizer actuator 19 shown in FIG. 2-B. The trip lever cable pulls the trip lever pawl of the Stabilizer actuator 19 shown in FIG. 2-B out of the notch in the piston rod 30, shown in FIG. 2-B releasing the tension in the coil spring 35, shown in FIG. 2-B, acting on the piston 33 shown in FIG. 2-B causing the piston rod 30 shown in FIG. 2-B to move toward the cylinder head 32 shown in FIG. 2-B exerting force on the rotating bar 66 shown in FIG. 2-A causing it to rotate about its central pivot 16 shown in FIG. 2-B and pushing the Stabilizer arms 6 shown in dotted lines shown in FIG. 2-A outward and toward the ground shown in 6 shown FIGS. 1-A, 2-A, 3, 4.

VII. Manual Deployment Mechanism of the Stabilizer Mechanism

The manual deployment mechanism of the Stabilizer mechanism includes the following elements:

1. A mechanically powered actuator 400 shown in FIGS. 2, 2-A and 2-B, including a cylinder 34 with one open and one closed end, shown in FIG. 2-B and a cylinder head 32 attached to the open end shown in FIG. 2-B with a concentric opening for the piston rod 30 shown in FIG. 2-B, a piston 33 shown in FIG. 2-B, with one or more self-lubricating piston rings, a coil spring 35 located between the piston and the closed end of the cylinder shown in FIG. 2-B, a piston rod 30 connected to the piston 33 on one end and to a pivoting joint 16 on the rotating bar on the opposite end shown in FIG. 2-B, an adjustable air bleed control mechanism in the cylinder head 31 including an air valve to control the movement of air displaced by the piston, shown in FIG. 2-B and a pivot joint 16 attached to the fixed end of the cylinder and attached to the container chassis shown in FIGS. 2, 2-A, 2-B.

(2) A trip lever release mechanism 400 shown in FIGS. 2, 2-B for the actuator.

(3) A trip lever manual control cable junction 17 shown in FIGS. 2, 2-B.

(4) A cable 67 shown in FIGS. 2, 2-B connecting the manual control cable junction to the trip lever.

(5) A pair of manual control levers 1 shown in FIGS. 1, 3, 5. located on either narrow side of the container (6) A pair trip lever manual operator cables 29 shown in FIGS. 2, 2-B connected on one end to control levers 1 shown in FIGS. 1, 3, 5, on either narrow side of the container, and on their other end to the manual control cable junction 17 shown in FIGS. 2, 2-B.

Manual Deployment of the Stabilizer Mechanism

When manual deployment is desired, the operator operates the manual stabilizer release control lever 1 shown in FIGS. 1, 3, 5, activating the release cable 29 shown in FIG. 2, that in turn, activates the trip lever pawl 19 of the actuator release mechanism 400 shown in FIGS. 2, 2-B releasing the actuator, 400 exerting force on the rotating bar 66 shown in FIGS. 2, 2-A, and causing deployment of the Stabilizer arms 6 shown in dotted lines in FIG. 2-A and shown in FIGS. 1-A, 3, 4.

VIII. Dual Retracting Mechanism of the Stabilizer Mechanism

The retracting mechanism of the Stabilizer mechanism includes the following elements:

(1) A mechanically powered actuator 400 shown in FIGS. 2, 2-A, 2-B.

(2) A rotating bar retracting cable 68 shown in FIG. 2, attached at one end to the rotating bar 66 shown in FIG. 2, and attached at its opposite end to a two-into-one retractor cable junction 20 shown in FIG. 2 mounted to the container chassis 200 shown in FIG. 2, and a pair of retractor operating cables 67 shown in FIG. 2 attached at one end to the cable junction 20 shown in FIG. 2 and at their opposite ends to a foot-pedal operated retractor mechanism 5 shown in FIGS. 1, 2, 3, 4, 5, 6.

(3) A foot-pedal operated cable retractor mechanism 5 shown in FIGS. 1, 2, 3, 4, 5, 6 located near the container bottom on either narrow side of the container, incorporating a ratchet-type mechanism that automatically operates to allow the cable to reel out without resistance upon deployment of the automatic stabilizer mechanism 400 and engages to retract the cable 67 shown in FIG. 2 when the foot-pedal is operated to retract the Stabilizer mechanism.

Operation of the Retracting Mechanism of the Stabilizer Mechanism

When retraction of the Stabilizer mechanism is desired, the operator depresses the foot pedal 5 shown in FIGS. 1, 2, 3, 4, 5, 6 acting on the retractor cables 67, shown in FIG. 2 and retractor cable junction 20 shown in FIG. 2 which in turn retracts the rotating bar retractor cable 68 shown in FIG. 2, that in turn, pulls the rotating bar and actuator back toward the cylinder 34 shown in FIG. 2, and resets the actuator trip lever release mechanism 400 shown in FIGS. 2, 2-A and 2-B.

IX. Dual-Control Dead Man Brake Mechanism

The dual-control dead man brake mechanism of the cargo container includes the following elements:
(1) A pair of fixed middle wheels 22 shown in FIGS. 1, 2, 3, 4, 5, 6 each with an internal or external dead man brake.
(2) A dual-control control dead man brake cable junction 300 shown in FIGS. 2, 7, 7-1, 7-2, 7-3, 7-4.
(3) An automatic brake override cable 21 shown in FIGS. 2, 2-B, 2-C, activated by the automatic pendular-actuator linkage 400 shown in FIGS. 2, 2-B, 2-C, 2-D.
(4) A pair of brake control cables 23 shown in FIGS. 2, 7, 7-1, 7-2, 7-3, 7-4, attached at one end to each dead man brake, and attached at the opposite end to the cable control junction 300 shown in FIGS. 2, 7, 7-1, 7-2, 7-3, 7-4.
(5) A pair of brake operator control cables 14 shown in FIGS. 2, 4, 6, 7, 7-1, 7-2, 7-3, 7-4 attached at one end to brake release handles 9 shown in FIGS. 1, 1-B, 1-C-1-E, 3, 4, 5, 6 located on each narrow side of the container and attached on the opposite end to the dead man brake control junction 300 shown in FIGS. 2, 7, 7-1, 7-2, 7-3, 7-4.
(6) A combination pull handle and brake release handle mechanism 3, 9 shown in FIGS. 1, 1-B, 1-C, 1-D, 1-E, 3, 4, 5, 6 at either narrow end of the container. The function of the pull handle for moving the container could be replaced or supplemented by a motorized movement mechanism, known to those skilled in the art, such as could also be accomplished by pneumatic, hydraulic, electrical, electro-hydraulic, electro-mechanical, electronic, or computerized means with or without computer control without departing the scope of the invention.

X. Combination Pull Handle and Dead Man Brake Control Mechanism

A combination pull handle and dead man brake control mechanism 3, 9 shown in FIGS. 1, 1-B, 1-C, 1-D, 1-E, 3, 4, 5, 6 including the following elements:
(1) Two equal length C channels 8 shown in FIGS. 1, 1-B, mounted in a parallel position to one another in a recessed area on either narrow side of the container.
(2) One pull handle 3 shown in FIGS. 1, 1-B, 1-C, 1-D, 1-E, 3, 4, 5, 6 including a half-round shaped fixed bar approximately 1 inch in diameter affixed at each end to the outer end of the parallel C channels 8 shown in FIGS. 1, 1-B, with the curved face of the bar facing outward, i.e., away from the body of the container shown in FIGS. 1, 1-C, 1-D.
(3) One brake release handle 9 shown in FIGS. 1, 1-B, 1-C, 1-D, 1-E, 3, 4, 5, 6 including a half-round shaped sliding bar approximately 1 inch in diameter affixed at each end to a rectangular flange 9 shown in FIG. 1-E with each flange fitted to slide along the length of the inside of each of the parallel C channels 8, shown in FIG. 1-E so that the sliding bar remains perpendicular to the C channels 8 shown in FIG. 1-B, with the curved face of the bar facing inward, i.e. toward the body of the container, and the flat face of the brake release handle facing the flat face of the pull handle 3 shown in FIGS. 1-B, 1-C, 1-D, 1-E.
(4) A cable stop bracket 13 shown in FIGS. 1-C, 1-D affixed to one of the rectangular flanges 9 affixed to brake release handle 9 shown in FIGS. 1-C, 1-D, 1-E.
(5) A fixed flange 11 shown in FIGS. 1-C, 1-D attached to the C channel facing the cable stop bracket connector, for mounting the brake operator control cable 14 shown in FIGS. 1-C, 1-D.
(6) A gap between the pull handle and the brake control handle shown in FIGS. 1-B, 1-D, 1-E to allow sufficient movement of the brake control cable to operate the dead man brake mechanism.
(7) A spring 10 shown in FIG. 1-D positioned in each C channel to keep the fixed and sliding bars separated when not being actuated to release the dead man brake.
(8) A low-friction surface on the contact surfaces of the rectangular flanges 9 shown in FIG. 1-E and inside surfaces of the C-channel 8 shown in FIGS. 1-B, 1-C, 1-D, 1-E to allow free and smooth movement of the brake release handle flanges within the C channels.

Manual operation of the combined pull handle and dead man brake control

When the container is at rest, the dead man brake on each fixed caster 22 shown in FIG. 2 is engaged locking the wheels and preventing movement of the container either fore and aft or in rotation along its vertical axis. To release the dead man brake and move the container, an operator places a hand around both bars of the pull handle 3 and brake release 9 shown in FIGS. 1-B, 1-C, 1-D, 1-E and squeezes them together. This action pulls the brake operator control cable 14 attached to the brake release handle 9 shown in FIGS. 1-C, 1-D, 1-E, causing the cable to act on the dead man brake cable junction 300 shown in FIGS. 2, 7, 7-1, 7-2, 7-3, 7-4 pulling the movable bracket 50 shown in FIGS. 7, 7-1, 7-2, 7-3, 7-4 toward the operator control base flange 55 shown in FIGS. 7, 7-1, 7-2, 7-3 in turn acting on the brake control cables 23 shown in FIGS. 2, 7, 7-1, 7-2, 7-3, 7-4 releasing the dead man brake on each center wheel.

The unique feature of the Dual Control Dead Man Brake Mechanism is that it can be operated by either of two operating levers located on opposite ends of the container, and that either lever can operate the dead man brake mechanism independently of the other or simultaneously.

XI. Brake Control Cable Junction with Automatic Cable Release and Manual Reset Mechanism A brake control cable junction 300 shown in FIGS. 2, 7, 7-1, 7-2, 7-3, 7-4 with automatic cable release and manual reset mechanism including the following elements:
(1) rectangular metal base ("base") 49 shown in FIGS. 7, 7-1, 7-2, 7-3, 7-4 with a transverse operator control base flange 55 shown in FIGS. 7, 7-1, 7-2, 7-3, projecting upward on one end with penetrations for mounting the operator control cable housing ends and the brake override reset cable housing end, and a transverse brake control base flange 59 projecting upward on the opposite end of the base with penetrations for mounting the brake control cable housing ends shown in FIGS. 7, 7-1, 7-2, 7-3.

(2) A rectangular movable bracket 50 ("bracket") shown in FIGS. 7, 7-1, 7-2, 7-3, 7-4 of shorter longitudinal dimension than the base, having transverse flanges projecting upward at the either end of the bracket and having longitudinal C-channels attached on both longitudinal sides of the base projecting downward, positioned with channel openings facing one other, separated by a distance slightly greater than the width of the base and positioned to engage with the longitudinal edges of the base 49 shown in FIGS. 7, 7-1, 7-2, 7-3, 7-4 and act as guides for the longitudinal movement of the bracket in relation to the longitudinal axis of the base shown in FIGS. 7, 7-1, 7-2, 7-3, 7-4.

(3) One transverse flange of the bracket, ("operator control bracket flange") 56 shown in FIGS. 7, 7-1, 7-2, 7-3, 7-4 is intended to be positioned adjacent to the operator control base flange 55 shown in FIGS. 7, 7-1, 7-2, 7-3, 7-4 having penetrations and provisions for mounting the operator control cables directly to the flange by means of barrel cable stops, and having a penetration for the brake override reset cable 26 shown in FIGS. 7, 7-1, 7-2, 7-3, 7-4.

(4) Two cable stop C-channels 58 shown in FIGS. 7, 7-1, 7-2, 7-3, 7-4 mounted adjacent and tangent to the inside face of the operator control flange of the movable bracket with the open end of the channel facing upward, centered with the penetrations for the operator control cables, extending a certain distance from the inside face of the operator control bracket flange toward the brake control bracket flange to allow sufficient clearance for attachment of the brake control cables to the opposite flange, and of equal height to the barrel cable stops 57 shown in FIGS. 7, 7-1, 7-2, 7-3, 7-4 and of sufficient width to allow the barrel cable stops 57 to move freely within the channel shown in FIGS. 7, 7-1, 7-3. The intention of this method of attaching the operator control cables 14 to the operator control bracket flange 56 is to allow the operator control cables to act independently of one another to manually control the dead man brake operation by allowing the operator control cables to engage the cable junction mechanism individually or simultaneously. Individual brake control operation is illustrated in FIG. 7-1 where one operator control cable stop 57 is shown having moved the bracket 50 toward the operator control base flange 55, thereby pulling the brake control cables 23 toward the operator control base flange, releasing the dead man brake mechanism.

(5) One transverse flange of the bracket, ("brake control bracket flange") 60 is positioned adjacent to the brake control flange of the base 59, and has penetrations for mounting the brake control cable ends directly to the flange and having provisions for attaching the brake override reset cable 26 directly to the flange on one end, and via a two-into-one cable junction 28 shown in FIG. 2, to the brake override reset levers 4 shown in FIGS. 1, 3, 5 mounted on either narrow end of the container.

(6) The movable 50 bracket shown in FIGS. 7, 7-1, 7-2, 7-3, 7-4 is constructed in two parts so that it can be separated into two sections parallel to the transverse centerline, as shown in FIGS. 7-2, 7-3, 7-4, or the sections can be attached to one another to act as one unit by means of an operable latching mechanism as shown in FIGS. 7-2, 7-3, 7-4, so that the two sections may be joined by the latching mechanism 50 shown in FIG. 7, 7-1 or disengaged from one another by disengagement of the latching mechanism as shown in FIGS. 7, 7-3, 7-4. The capability of separating the two sections of the movable bracket is intended to provide an override of the manual controls for the dead man brake mechanism in the event of automatic deployment of the stabilizer mechanism. This would be accomplished by disengaging the operator control side of the bracket as shown in FIG. 7-2 from the brake control side of the sliding bracket as shown in FIG. 7-2.

XII. Automatic Override Mechanism of the Dead Man Brake Manual Control

An automatic override mechanism for the Dead Man Brake Manual Control is provided including the following elements:

(1) A ratchet 54 shown in FIGS. 7,7-1,7-2, 7-3, 7-4, mounted to the underside of one section of the rectangular movable bracket.

(2) A locking pawl 53 shown in FIGS. 7,7-1,7-2, 7-3, 7-4 mounted to the underside of the other section of the rectangular movable bracket so that it can engage with the teeth of the ratchet.

(3) A tensioning spring 52 shown in FIGS. 7,7-1,7-2, 7-3, 7-4 mounted to the underside of one section of the rectangular movable bracket to hold the locking pawl firmly against the teeth of the ratchet, to lock the two sections of the rectangular movable bracket when the two sections are joined together.

(4) An automatic brake override actuator cable 21 shown in FIGS. 2, 2-B, 7, 7-1, 7-2, 7-3, 7-4 attached on one end to the pendular actuator 400 shown in FIGS. 2, 2-B, 2-C, 2-D and on its opposite end to the rotating cam 51 of the dead man brake cable junction.

(5) A rotating cam 51 shown in FIGS. 7,7-1,7-2, 7-3, 7-4, mounted on a pivot and positioned adjacent to the locking pawl, and having a provision for attaching the automatic brake override actuator cable 21 shown FIGS. 2, 2-B, 2-C, 2-D, 7,7-1,7-2, 7-3, 7-4 on one end so that operation of the cable will cause the cam to rotate on its pivot and raise the locking pawl, causing it to disengage from the ratchet.

Operation of the Automatic Override for the Dead Man Brake Manual Control

In the event of automatic deployment of the stabilizer mechanism, the automatic pendular actuated linkage 400 shown in FIGS. 2, 2-B, 2-C, 2-D will also act on the automatic brake override cable, 21 shown FIGS. 2, 2-B, 2-C, 2-D, 7,7-1,7-2, 7-3, 7-4 causing it to rotate the cam 51 shown in FIGS. 7,7-1,7-2, 7-3, 7-4, of the automatic override mechanism of the dead man brake control cable junction 300 as shown in FIG. 7-4. When the automatic brake override mechanism is activated, as shown in FIG. 7-4, the locking pawl 53 is disengaged from the ratchet 54 as shown in FIG. 7-4, allowing the two sections of the rectangular movable bracket 50 to separate as shown in FIGS. 7-2, 7-4 disengaging the brake control cables 23 from the operator control cables 14 as shown in FIGS. 7-2, 7-4, thereby allowing the brake to automatically engage.

XIII. Automatic Override Reset Mechanism

A reset mechanism for the Automatic Override of the Dead Man Brake Manual Control is provided including the following elements:

(1) A brake override reset lever 4 on each narrow end of the container as shown in FIGS. 1, 3, 5.

(2) Two brake override reset cables 26 shown in FIG. 2. that are attached to the brake override reset levers on each narrow side of the container and to the two-into-one brake override reset cable junction 28 shown in FIG. 2.

(3) A two-into-one cable junction 28 shown in FIG. 2 feeding a single brake override reset cable 26 into the brake cable junction 300, which cable is attached to the brake control cable bracket flange 60 of the moving bracket 50 as shown in FIGS. 2, 7, 7-1, 7-2, 7-3, 7-4.

Operation of the Automatic Brake Override Reset Mechanism

To reset the dead man brake operator control cables to manual operation, the operator activates the brake override reset lever 4 shown in FIGS. 1, 3, 5, which acts on the brake override reset cable 26 shown in FIGS. 2, 7, 7-1, 7-3 causing the cable 26 to move the two sections of the bracket 50 shown in FIGS. 7, 7-1, 7-3 together as engaging the locking pawl 53 and ratchet 54 shown in FIGS. 7, 7-1, 7-3, so that the two halves of the moving bracket act as one unit, and the brake control cables 23 shown in FIGS. 7, 7-1, 7-3 can again be controlled by the operator control cables 14 shown in FIGS. 7, 7-1, 7-3.

XIV. The Urban Intermodal Freight System

A. Elements of the Urban Intermodal Freight System™

The elements of the Urban Intermodal Freight System™ ("UIFS") consist of one of more of the following:

A. Intermodal Cargo Container ("ICC") 100 FIGS. 8 through 8E and 9 through 9C
B. An Electrified Urban Rail Mass Transit System 800 FIGS. 8, 8A, 8B, 8C, and 9, 9A
C. Primary Transfer Terminal ("PTT") 500 FIGS. 8 through 8E
D. Linear Loading Dock and Conveyor System ("LLDCS") 600 FIGS. 8 through 8D
E. Remote Delivery and Return Station ("RDRS") 700 FIGS. 9 through 9B
F. Delivery Loop Vehicles ("DLV's") 126 FIGS. 9A, 9B, 9C

Common features to both PTT and RDRS are:
1. A means of entry and exit of transportable items
2. Separation of transportable items from passenger movement and travel
3. Secure end-to-end containment of transportable items from the time of receipt by the UIFS to the time of handoff to the recipient The PTT has the following unique features:
1. A means of transferring a large volume of transportable items to and from delivery trucks of varying capacities
2. A means for parking and loading/unloading delivery trucks where no loading dock facilities are available The RDRS has the following unique features:
1. A means of moving transportable items between the RDRS and street level
2 An interface with delivery vehicles
3. An attendant fleet of small scale, electrically operated delivery vehicles A. Intermodal Freight Containers The Intermodal Freight Containers ("ICC") 100 shown in FIGS. 8 through 8E and FIGS. 9 though 9C, are described in detail in application Ser. No. 17/030,323 and their description is incorporated herein by reference. The ICC's represent one preferred embodiment of the invention. However, the Urban Intermodal Freight System as described herein may be used to transport other container types and configurations as well as other means of parcel, package and freight containment and handling that may be accommodated.

In one preferred embodiment of the invention, the ICC's are equipped with at least one means of signaling to various tracking and position sensing devices that are commonly used in the package, parcel and freight shipping industries to determine the location and condition of freight and the equipment in which it is transported. It is intended that the UIFS and its physical facilities, including PTT's and RDRS's will be equipped with sensing devices to track the movement and condition of ICC's and their contents within the system.

B. An Electrified Urban Rail Mass Transit System

The Urban Intermodal Freight System ("UIFS") is intended to work integrally with an existing Electrified Urban Rail Mass Transit System 800 shown in FIGS. 8, 8A, 8C, 8D, and 9, 9A An example of such a system is the New York City Subway System. It is intended that the UIFS will capture unused capacity in such a system by shipping containerized freight on exclusively reserved portions of passenger trains or specially scheduled additional trains during off-peak or other operating periods permitted by a transit operating authority.

During periods of UIFS operation, it is intended that in cooperation with a transit operating authority that a number of reserved cars would be made available for exclusive use by the UIFS, and that passenger areas in stations would be physically separated from UIFS operating areas during its periods of operation.

C. Primary Transfer Terminal

The Primary Transfer Terminal ("PTT") 500 FIGS. 8 through 8E, is intended to be a main entry point for items being shipped via the UIFS, as well as a main collection point for containers exiting the system. The following description describes a preferred embodiment of a PTT at an elevated location. However, the same operating principles would apply to a PTT located at grade level or below grade level. It is the intention that ICC's, 100, shown in FIGS. 8A, 8B, 8C, and FIGS. 9, 9A, 9B, 9C will be able to move in both directions, i.e., inbound and outbound at the PTT, Remote Delivery and Return Station, and any other transfer points within the UIFS. However, for clarity, the following description is limited to the movement of an inbound ICC arriving by truck.

The combination of an Existing Transit Station 800 FIGS. 8A, 8C, 8D and a Linear Loading Dock and Conveyor System ("LLDCS") 600 shown in FIGS. 8, 8A, 8B, 8C, 8D constitutes one preferred embodiment of the PTT. At a location proximate to an Existing Transit Station 800 FIGS. 8A, 8C, 8D, preferably located at a transit line terminus, on an Existing Roadway, 106 FIGS. 8A, 8B, 8C, 8D, (1) a reserved parking lane, 106 FIGS. 8A, 8B, 8C, 8D, (2) an adjacent traffic lane, 106 FIGS. 8B, 8C, 8D (3) an Existing Curb, 190 FIGS. 8A, 8B and (4) a portion of an Existing Sidewalk 108 FIGS. 8A, 8B, will be equipped with a LLDCS, 600, FIGS. 8A, 8B, 8C, 8D.

In one preferred embodiment of the invention, ICC's 100 shown in FIGS. 8A, 8B, 8C, 8D 8E and FIGS. 9, 9A, 9B, 9C are pre-loaded with freight and addressed and tagged for a delivery destination by the shipper. The shipper then arranges for truck transport of the ICC 100 shown in FIGS. 8A, 8B, 8C, 8D 8E and FIGS. 9, 9A, 9B, 9C to a PTT 500 FIGS. 8 through 8E.

D. Linear Loading Dock And Conveyor System

The combination of an existing or planned end-of-line transit station and a Linear Loading Dock and Conveyor System ("LLDCS") 600 shown in FIGS. 8, 8A, 8B, 8C, 8D, constitute one preferred embodiment of the Primary Transfer Terminal. At a location proximate to an existing or planned transit station, preferably at its terminus, a reserved parking lane an adjacent traffic lane and a portion of the adjacent curb and sidewalk will be equipped with a LLDCS.

The LLDCS (600) shown in FIGS. 8 through 8D, consists of (a) one or more perpendicularly movable sections of roadway (Parking Pad 102 shown in FIGS. 8A, 8C) parallel to the Existing Curb, 109 in FIGS. 8A, 8B, 8C that are capable of being positioned either (1) in the parking lane immediately adjacent to the Existing Curb, 102, 104 FIGS. 8A, 8B, or (2) within the traffic lane parallel to the parking lane, 102, 101 FIGS. 8A and 8C, by traversing a Parking Pad Travel Area 103, FIGS. 8A, 8B, 8C, and (b) a system of connected horizontal and vertical reciprocating conveyors, consisting of (1) a Street Horizontal Conveyor, 107, FIGS. 8A, 8B, 8C, (2) a Street Vertical Reciprocating Conveyor ("Street VRC") 112 FIGS. 8A, 8C, (3) a Horizontal Overhead Conveyor, 113 FIGS. 8A, 8C, (4) a Platform Vertical Reciprocating Conveyor ("PLATFORM VRC"), 114 FIGS. 8C, 8D, and (5) a Buffer Storage Area, 129 FIG. 8D.

When an arriving truck is ready to deliver or pick up containers at the PTT 500, the truck sends a signal to the LLDCS. The LLDCS then assigns a loading dock slot to the arriving truck. The LLDCS will cause a Parking Pad. 102 shown in FIGS. 8A, 8C, to extend from the curb to the adjacent traffic lane, 102, 101 FIGS. 8A, 8C, after which the truck will be directed drive onto the parking pad and stop. The Parking Pad 102, 101 FIGS. 8A, 8C, will automatically move the truck to a position immediately adjacent to the Existing Curb 104 FIGS. 8A, 8B, and a Movable Loading Platform 105 FIGS. 8A, 8B will be brought to the tailgate of the truck. In one preferred embodiment of the invention, a means for moving the Parking Pad is provided by a motor driven linear drive system, similar to that used in a motor driven garage door. The Movable Loading Platform 105 FIGS. 8A, 8B and tailgate of the Truck in Curbside Position, 104, FIGS. 8A, 8B will be brought into alignment with an opening in the Street Horizontal Conveyor Enclosure 111, FIGS. 8A, 8B, facing the street.

At that point, inbound containers, ICC's 100 shown in FIGS. 8A, 8B, 8C, 8D, 8E and 9, 9A, 9B, 9C will be unloaded from the truck and placed on the Street Horizontal Conveyor 107 FIGS. 8A, 8B, 8C. After unloading, the truck may pick up outbound containers via the Street Horizontal Conveyor 107 FIGS. 8A, 8B, 8C. It is intended that the movement of ICC's from Truck in Curbside Position 104, FIGS. 8A, 8B to LLDCS (600) shown in FIGS. 8 through 8D, will be either by manual, robotic, autonomous means, or any combination thereof.

In one preferred embodiment of the invention, the Street Horizontal Conveyor 107 FIGS. 8A, 8B, 8C, consists of (1) a Conveyor Base 110 FIG. 8B, to serve as a foundation and support for the Street Horizontal Conveyor, (2) a Street Horizontal Conveyor Enclosure, 111, FIGS. 8A, 8B, to provide security, weather protection and climate control to the conveyor and its contents, (3) a motor powered Street Horizontal Conveyor 107, FIGS. 8A, 8B and (4) a means for moving ICC's in opposite directions, i.e., inbound and outbound directions simultaneously or moving all ICC's in the same direction simultaneously.

In one preferred embodiment of the invention, the Street Vertical Reciprocating Conveyors, ("Street VRC's") 112 FIGS. 8A, 8C, are provided. The Street VRC's consists of one or more vertical reciprocating conveyors, connected on the street level to the Street Horizontal Conveyor 107, FIGS. 8A, 8B, 8C, and at the overhead level to the Overhead Horizontal Conveyor 113, FIGS. 8A, 8C, 8D. The Street VRC's 112 FIGS. 8A, 8C are motor powered, and enclosed in a weather protecting, secure enclosure, 112 FIGS. 8A, 8C, 8D. A means is provided for automatic transfer of ICC's between the Street Horizontal Conveyor, 107, FIGS. 8A, 8B, 8C and Street VRC's 112 FIGS. 8A, 8C, and a means is provided for automatic transfer of ICC's from the Street VRC's 112 FIGS. 8A, 8C to the Horizontal Overhead Conveyor 113 FIGS. 8A, 8C, 8D.

In one preferred embodiment of the invention, a Horizontal Overhead Conveyor 113 FIGS. 8A, 8C, 8D is provided. The Horizontal Overhead Conveyor 113 FIGS. 8A, 8C, 8D is located in a structural Horizontal Overhead Conveyor enclosure 117 FIGS. 8A, 8C, 8D that serves as a bridge traversing the Existing Roadway 106, FIGS. 8A, 8C, 8D, and also provides a secure weather-tight, climate controlled environment around the conveyor and its contents.

After ICC's 100 shown in FIGS. 8A through 8E and 9 through 9C, are transferred from the Street VRC 112 FIGS. 8A, 8C, to the Overhead Horizontal Conveyor 113 FIGS. 8A, 8C, 8D, the ICC's will be either transferred to the Platform Vertical Reciprocating Conveyor ("Platform VRC") 114 FIGS. 8C, 8D, or to a Buffer Storage Area 129 FIG. 8D, which may contain an Automated Storage and Retrieval System such as commonly used in the warehouse, logistics and material handling industries. An example is the Interlake Mecalux Stacker Crane AS/RS for Pallets, System.

In the buffer storage area, ICC's may be accumulated pending movement in either direction. The Platform VRC's are secured when not in use by Vertical Reciprocating Conveyor Security Doors, 122, FIG. 8D.

ICC's 100 shown in FIGS. 8A through 8E and 9 through 9C, transferred to the Platform VRC 114 FIGS. 8C, 8D, will be transported to the Passenger Platform 116 FIGS. 8C, 8D and placed on an exclusively reserved car on an inbound Passenger Train 118 FIGS. 8C, 8D for transport. It is intended that transfer of ICC's on the Passenger Platform 116 FIGS. 8C, 8D may be accomplished by manual movement, robotic movement, autonomous movement, or any combination thereof. It is also intended that the exclusively reserved car may be a standard passenger car or a car that is specially adapted for carrying ICC's.

It is intended that reserved cars of the Passenger Train 118 FIGS. 8C, 8D will be used exclusively for ICC transport only, and not for passenger use when transporting ICC's or other freight. It is further intended that a means for separation of passenger and freight service be employed on the Passenger Trains 118, FIGS. 8A, 8C, 8D, 8E, 9, 9A when freight is being transported, and on all Passenger Platforms 116, FIGS. 8C, 8D, 8E, and 120 FIGS. 9, 9A during UIFS operations. In one preferred embodiment of the invention, a Movable Gate 123, FIG. 9 to separate freight and passenger areas is shown in deployed position at an RDRS, 700 FIG. 9.

After ICC's are placed on the Passenger Train, 118 FIGS. 8C, 8D, 8E they will be carried to one or more destinations accessed via planned or existing Remote Delivery and Return Stations ("RDRS") 700 FIGS. 9, 9A, 9B.

The Linear Loading Dock and Conveyor System 600 shown in FIGS. 8, 8A, 8B, 8C, 8D, may also be used as a stand-alone system in other applications, i.e., for access to a facility, building or vehicle from a location where no on-site loading dock or truck parking is possible.

E. Remote Delivery and Return Station

A Primary Transfer Terminal ("PTT") 500 FIGS. 8 through 8E will connect via the existing or planned transit rail infrastructure to one or more Remote Delivery and Return Stations ("RDRS") 700 FIGS. 9, 9A, 9B. The combination of a planned or existing passenger station, e.g., 119, FIGS. 9, 9A with a means of transport for ICC's or other freight between passenger platforms, e.g. 120, FIGS. 9, 9A and street, e.g. 106, FIGS., 9A, 9B, 9C, constitute one preferred embodiment of a RDRS.

The following description describes a preferred embodiment of a Remote Delivery and Return Station ("RDRS") at a below grade location. However, the same operating components and principles would apply to a grade level or elevated RDRS. It is the intention that ICC's, 100 shown in FIGS. 9 though 9C, will be able to move in both directions, i.e., inbound and outbound at the RDRS and any other transfer points within the System. However, for clarity, the following description is limited to the movement of an inbound ICC arriving by truck at a PTT 500, FIGS. 8A, 8B, 8C, 8D, 8E and transported via Passenger Train, 118 FIGS. 8C, 8D, 8E, 9, 9A to an RDRS, 700 FIGS. 9, 9A, 9B.

As the Passenger Train, 118 FIGS. 8C, 8D, 8E, 9, 9A carrying ICC's enters a RDRS, 700 FIGS. 9, 9A, B, one or more Sensing Devices, 130 FIG. 9A, will register information from the ICC's indicating the ICC's that will disembark at that station. When the train stops, ICC's will be transported off the train by either manual, robotic or autonomous movement or a combination thereof. The delivered ICC is moved to a Buffer Area 129, FIG. 9 to await transport to by a Platform to Street Vertical Reciprocating Conveyor ("Platform to Street VRC") 121 FIGS. 9, 9A, 9B. The Platform to Street VRC's are secured when not in use by Vertical Reciprocating Conveyor Security Doors 122, FIG. 9, 9C.

Platform to Street Vertical Reciprocating Conveyors 121 FIGS. 9, 9A, 9B, are provided to connect the Below Grade Passenger Platform 120 FIGS. 9, 9A, to the Existing Street, 106 FIGS. 9A, 9B. A Platform to Street Vertical Reciprocating Conveyor Enclosure 124 FIG. 9, 9A, 9B, with Vertical Reciprocating Conveyor Security Doors 122 FIGS. 9, 9A, 9B, is provided at street level. In one preferred embodiment of the invention, Delivery Loop Vehicles 126 FIGS. 9A, 9B, 9C, will cue at the Platform to Street VRC Enclosure 124 FIG. 9A, 9B, and pick up and or drop off ICC's that are arriving or departing by train. In another preferred embodiment of the invention, each RDRS will have two sets of Platform to Street VRC's 121 FIGS. 9A, 9B on opposite sides of the Existing Street 106 FIGS. 9A, 9B, to separately serve inbound and outbound ICC transport. (Q include a 10-2A to show both sides?)

F. Delivery Loop Vehicles

Each RDRS is attended by a fleet of Delivery Loop Vehicles ("DLV's") 126, FIGS. 9B, 9C for the purpose of transporting ICC's between the RDRS and delivery locations. It is intended that off street parking and charging will be provided for the DLV Fleet. It is further intended that the DLV's 126 FIGS. 9B, 9C will operate in a geographically defined area in relation to the RDRS and provide both delivery and pick up service between end destinations and a specific RDRS. In one preferred embodiment of the invention, the DLV 126 FIGS. 9B, 9C will be electrically powered, of sufficiently small size and configuration as to be pedestrian friendly, safely operable on streets, sidewalks or loading docks, low-speed, and operable by a driver, or autonomously, or in a combination of driver or autonomous operation. The DLV 126 FIGS. 9B, 9C will be equipped with a means of safely raising and lowering ICC's to and from a delivery or pickup location, and a cab to protect a driver from inclement weather and other hazards associated with its operation. In one preferred embodiment of the present invention, a DLV 126 FIG. 9C is equipped with a Folding Ramp 127 FIG. 9C, a Curb Ramp 128 FIG. 9C and a Winch 131 FIG. 9C to move ICC's on and off the DLV. A current example of this type of vehicle IN production, is the Taylor-Dunn Bigfoot.

SCOPE OF THE PRESENT INVENTION

In the foregoing description, certain terms and visual depictions are used to illustrate the preferred embodiment. However, no unnecessary limitations are to be construed by the terms used or illustration s depicted, beyond what is shown in the prior art, since the terms and illustrations are exemplary only, and are not meant to limit the scope of the present invention. It is further known that other modifications may be made to the present invention, without departing the scope of the invention.

In comparison to the mechanical components described in this embodiment, it is assumed that the functions described could also be accomplished by pneumatic, hydraulic, electrical, electro-hydraulic, electro-mechanical, electronic, or computerized means with or without computer control without departing the scope of the invention.

I claim:

1. A cargo storage compartment comprising a three-dimensional container having front, rear, left side, right side, top and bottom walls, with an at least one openable and closable door, said three-dimensional container configured to enclose an internal storage cavity for secure storing and carrying cargo therein;
    a chassis directly attached to said three-dimensional container, said chassis being affixed permanently attached and integral with a bottom of said three-dimensional container;
    a plurality of rolling movement members for moving said three-dimensional container;
    a selectively releasable dead man wheel brake mechanism;
    at least one manually graspable push/pull handle containing a manual release control for said selectively releasable dead-man brake mechanism;
    an automatic override for the selectively releasable dead-man brake mechanism;
    wherein said three-dimensional container having said rolling movement members and internal storage cavity for secure storing and carrying cargo therein is moved electro-mechanically.

2. The cargo storage compartment of claim 1 wherein said plurality of rolling movement members are selected from the group consisting of wheels or casters.

3. The cargo storage compartment of claim 1 wherein said at least one manually graspable push/pull handle, is a plurality of manually graspable push/pull handles, and wherein each said at least one manually graspable push/pull handle containing a manual release control for said selectively releasable dead-man wheel brake mechanism is a plurality of manually graspable push/pull handles each containing said manual release control for said selectively releasable dead-man wheel brake mechanism.

* * * * *